United States Patent
Motohashi et al.

(10) Patent No.: US 6,247,855 B1
(45) Date of Patent: *Jun. 19, 2001

(54) LENS PROTECTION COVER-ATTACHED CAMERA

(75) Inventors: Katsumi Motohashi, Hoya; Yuji Kobayashi; Naohiro Tsuchida, both of Hachioji; Takashi Muroi; Yuji Imai, both of Higashiyamato; Yasuo Asakura, Hachioji, all of (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/239,402

(22) Filed: Jan. 28, 1999

(30) Foreign Application Priority Data

Jan. 29, 1998 (JP) .................................................. 10-017413

(51) Int. Cl.[7] ........................... G03B 17/02; G03B 17/04; G03B 11/04
(52) U.S. Cl. ........................................... 396/448; 396/535
(58) Field of Search .................................... 396/348, 349, 396/448, 535

(56) References Cited

U.S. PATENT DOCUMENTS

| | | | |
|---|---|---|---|
| 4,264,172 | * 4/1981 | Miyagawa et al. | 396/448 |
| 4,500,184 | * 2/1985 | Morizumi et al. | 396/448 |
| 5,051,765 | * 9/1991 | Yoshizaki et al. | 396/349 |
| 5,602,607 | * 2/1997 | Kato et al. | 396/448 |
| 5,797,047 | * 8/1998 | Ando et al. | 396/349 |
| 5,862,426 | * 1/1999 | Ichino et al. | 396/448 |
| 5,913,089 | * 6/1999 | Ebe | 396/448 |
| 6,033,130 | * 3/2000 | Muroi et al. | 396/448 |

FOREIGN PATENT DOCUMENTS 9113959  5/1997 (JP) .

* cited by examiner

Primary Examiner—Alan A. Mathews

(57) ABSTRACT

A lens protecting cover-attached camera includes a moving mechanism. Thus, a simple mechanism is used to turn on or off a main power switch and for opening or closing a lens protecting cover responsively to manipulations performed on a single manipulating member. A supporting shaft for supporting the lens protecting cover is placed so as to be parallel to a plane substantially perpendicular to the optical axis of a photographic lens. When the supporting shaft is moved along the optical axis of the photographic lens, the moving mechanism causes the lens protecting cover to rotate around the supporting shaft at the center from a closed position to an open position. At the closed position, the lens protecting cover shields the face of the photographic lens. At the open position, the lens protecting cover exposes the face of the lens. Moreover, the moving mechanism turns on or off the power switch in response to a movement made along the optical axis of the photographic lens.

33 Claims, 21 Drawing Sheets

LENS PROTECTION COVER-ATTACHED CAMERA

BACKGROUND OF THE INVENTION

1. Field of the Invention

The present invention relates to a lens protecting cover-attached camera. More particularly, this invention is concerned with a camera having a lens protecting cover that shields the face of a photographic lens to protect the photographic lens when closed so that it can be opened freely.

2. Description of the Related Art

In the past, various types of lens protecting cover-attached cameras have been proposed as for performing photography and have been put to practical use. In this type of camera, a camera body is provided with a member for protecting the face of a photographic lens by shielding the face of a photographic lens barrel when closed in a matter in which it can be opened freely.

For example, Japanese Unexamined Patent Publication No. 9-113959 has disclosed a lens protecting cover-attached camera having a lens protecting cover that pivots around a supporting shaft. The supporting shaft is placed substantially parallel to a plane substantially orthogonal to the optical axis of a photographic lens. The lens protecting cover is collapsed to move from a closed position, at which it shields the face of the photographic lens, to an open position at which it exposes the face thereof.

FIG. 34 is an oblique view schematically showing a camera disclosed in Japanese Unexamined Patent Publication No. 9-113959. The movements made in the camera 100 will be briefed below.

To begin with, when a power switch 103 is changed from an off state to an on state, a photographic lens barrel 105 thrusts forward from a collapsed position at which it is disposed non-photography. The photographic lens barrel 105 thus moves to a photographing position at which it is disposed during photography. A lens protecting cover 101 turns in the direction of arrow O in response to the thrusting movement. The lens protecting cover 101 thus moves from a closed position at which it shields the face of the photographic lens to an open position at which it exposes the face thereof. Concurrently with these movements, a strobe lighting unit 108 turns in the direction of arrow SI in FIG. 34. The strobe lighting unit 108 thus pops up above the top of a camera 100 and moves to a strobe lighting-enabled position. Thus, the strobe lighting unit 108 is positioned either as indicated with a dot-dash line in FIG. 34 or fully popped up.

In contrast, when the power switch 103 is changed from the on state to the off state, the photographic lens barrel 105 is plunged from the photographing position into the collapsed position. In response to this movement, the strobe lighting unit 108 turns in the direction of arrow S2 in FIG. 34. The strobe lighting unit 108 thus returns from the popped-up position indicated with the dot-dash line in FIG. 34 to a stowed position indicated with a solid line in FIG. 34. At this time, the lens protecting cover 101 does not respond to these movements but remains in the open position shown in FIG. 34.

As mentioned above, the lens protecting cover-attached camera 100 has been proposed in Japanese Unexamined Patent Publication No. 9-113959 and the like, and has been used practically in the past. When the power switch 103 is changed from the off state to the on state, the camera 100 is set from the non-photographic state to the photographic state. At this time, the power switch 103 should merely be changed from the off state to the on state. Thus, the photographic lens barrel 105 is moved from the non-photographing position to the photographing position. This causes the lens protecting cover 101 to turn in the direction of arrow 0 and thus move from the closed position to the open position. Also the strobe lighting unit 108 is moved from the stowed position to the popped-up position.

However, as far as the lens protecting cover-attached camera 100 of the prior art disclosed in Japanese Unexamined Patent Publication No. 9-113959 is concerned, the lens protecting cover 101 does not respond to a movement for changing the power switch 103 from the on state to the off state. For setting the camera 100 to a fully non-photographic state, after the power switch 103 is moved to the off position, the lens protecting cover 101 must be manually returned from the open position to the closed position. This is cumbersome.

Moreover, in the camera disclosed in Japanese Unexamined Patent Publication No. 9-113959, after the power switch 103 is turned off, the lens protecting cover 101 may be left unclosed. In other words, the lens protecting cover 101 may be retained in the open state. In this case, the cover 101 extends significantly forward relative to the photographic lens barrel 105. There is a high possibility that an unintended extraneous force or impact may be imposed to the lens protecting cover 101. Eventually, the lens protecting cover 101 may be broken.

In an effort to solve the above problem or prevent the lens protecting cover 101 from being broken, a member located near a supporting unit for supporting the lens protecting cover 101 has been reinforced in the past. Otherwise, an auxiliary member has been included for holding the lens protecting cover 101 at the open position. However, the adoption of the additional member increase the size of the camera itself. This is unavoidable.

On the other hand, the camera that has been disclosed in Japanese Unexamined Patent Publication No. 9-113959 has a pop-up mechanism for popping up the strobe lighting unit 108. In the camera, a driving force exerted by a motor or the like is utilized for, for example, extending the photographic lens barrel 105. Due to a loss in driving force exerted by the motor, the motor to be incorporated in the camera must be capable of providing a larger output. This poses a problem in that the camera must be made to be larger in size.

Some cameras of related arts include a pop-up mechanism for popping up a strobe lighting unit. In the pop-up mechanism, unlike the pop-up mechanism described in conjunction with FIG. 34, a driving force exerted by a motor or the like is not utilized for popping up the strobe lighting unit. These cameras of the related art generally adopt a structure having a mechanical interlocking member interposed between the pop-up mechanism for popping up the strobe lighting unit and a power switch. The structure does not utilize a driving force to be exerted for driving a photographic lens barrel, but causes the strobe lighting unit to pop up in response to a changing movement made by the power switch.

However, in this case, an effort must be made to shorten the route of the interlocking member as much as possible. This is intended to ensure reliability for manipulations and to provide a compact design for the camera. The power switch and the pop-up mechanism for popping up the strobe lighting unit must therefore be located close to each other. Limitations are imposed on designing. This poses a problem in that the freedom in designing a camera is impaired and the locations of the members of a camera are restricted.

SUMMARY OF THE INVENTION

The first object of the present invention is to provide a lens protecting cover-attached camera capable of preventing breakage of a lens protecting cover. Herein, a driving force exerted by a motor or the like is not utilized, but a simple mechanism is provided for turning on or off a main power switch and for opening or closing the lens protecting cover in response to manipulations performed on a single manipulating member.

The second object of the present invention is to provide a lens protecting cover-attached camera capable of contributing to the design of a compact camera. Herein, a driving force exerted by a motor or the like is not utilized, but a simple mechanism is provided for turning on or off a main power switch, for opening or closing the lens protecting cover, and for popping up a strobe lighting unit in response to successive manipulations performed on a single manipulating member.

Briefly, according to the first aspect of the present invention, a camera includes a photographic lens, a lens protecting cover, a supporting shaft, and a moving mechanism. The lens protecting cover protects the photographic lens. The supporting shaft lies parallel to a plane substantially perpendicular to the optical axis of the photographic lens and supports the lens protecting cover. When the supporting shaft is moved along the optical axis of the photographic lens, the moving mechanism causes the lens protecting cover to pivot around the supporting shaft. The lens protecting cover thus moves from a closed position at which it shields the face of the photographic lens, to an open position at which it exposes the face thereof. The moving mechanism makes a movement for turning on or off the power switch in response to the movement made along the optical axis of the photographic lens.

Moreover, according to the second aspect of the present invention, a camera includes a lens barrel, a lens protecting cover, a moving mechanism, and a strobe lighting unit. The lens barrel accommodates a photographic lens. The lens protecting cover is supported by a supporting shaft placed parallel to a plane substantially perpendicular to the optical axis of the lens barrel, and is designed to protect the photographic lens. When the supporting shaft is moved along the optical axis of the lens barrel, the moving mechanism causes the lens protecting cover to pivot around the supporting shaft from a closed position to an open position. At the closed position, the lens protecting cover shields the face of the photographic lens. At the open position, the lens protecting cover exposes the face thereof. The moving mechanism makes a movement for turning on or off the power switch in response to the movement made along the optical axis of the lens barrel. The strobe lighting unit pops up from a stowed position to an irradiating position in response to the movement made along the optical axis by the lens protecting cover. At the stowed position, the strobe lighting unit is stowed in the camera body. At the irradiating position, strobe lighting is enabled.

These and other objects of the present invention and the advantages thereof will be apparent from the description below.

According to the present invention, there is provided a lens protecting cover-attached camera capable of preventing breakage of a lens protecting cover. Herein, a driving force exerted by a motor is not utilized, but a simple mechanism is provided to make movements for turning on and off a main power switch and for opening and closing the lens protecting cover in response to manipulations performed on a single manipulating member.

Moreover, according to the present invention, there is provided a lens protecting cover-attached camera contributing to the design of a compact camera. Herein, a driving force exerted by a motor or the like is not utilized, but a simple mechanism is used to make successive movements for turning on and off a main power switch, for opening and closing a lens protecting cover, and for popping up a strobe lighting unit in response to manipulations performed on a single manipulating member.

BRIEF DESCRIPTION OF THE DRAWINGS

FIG. 21 is an enlarged cross-sectional view of the 20—20 cutting plane of the relevant portion of the camera shown in FIG. 18, showing the strobe pop-up mechanism in a state in which the lens protecting cover is located at the open position and the main power switch is turned on;

FIG. 32 is an enlarged cross-sectional view of the 31–31 cutting plane of the relevant portion of the camera shown in FIG. 29, showing the strobe pop-up mechanism in a state in which the lens protecting cover is located at the open position and the main power switch is turned on;

DESCRIPTION OF THE PREFERRED EMBODIMENTS

Figure 1:
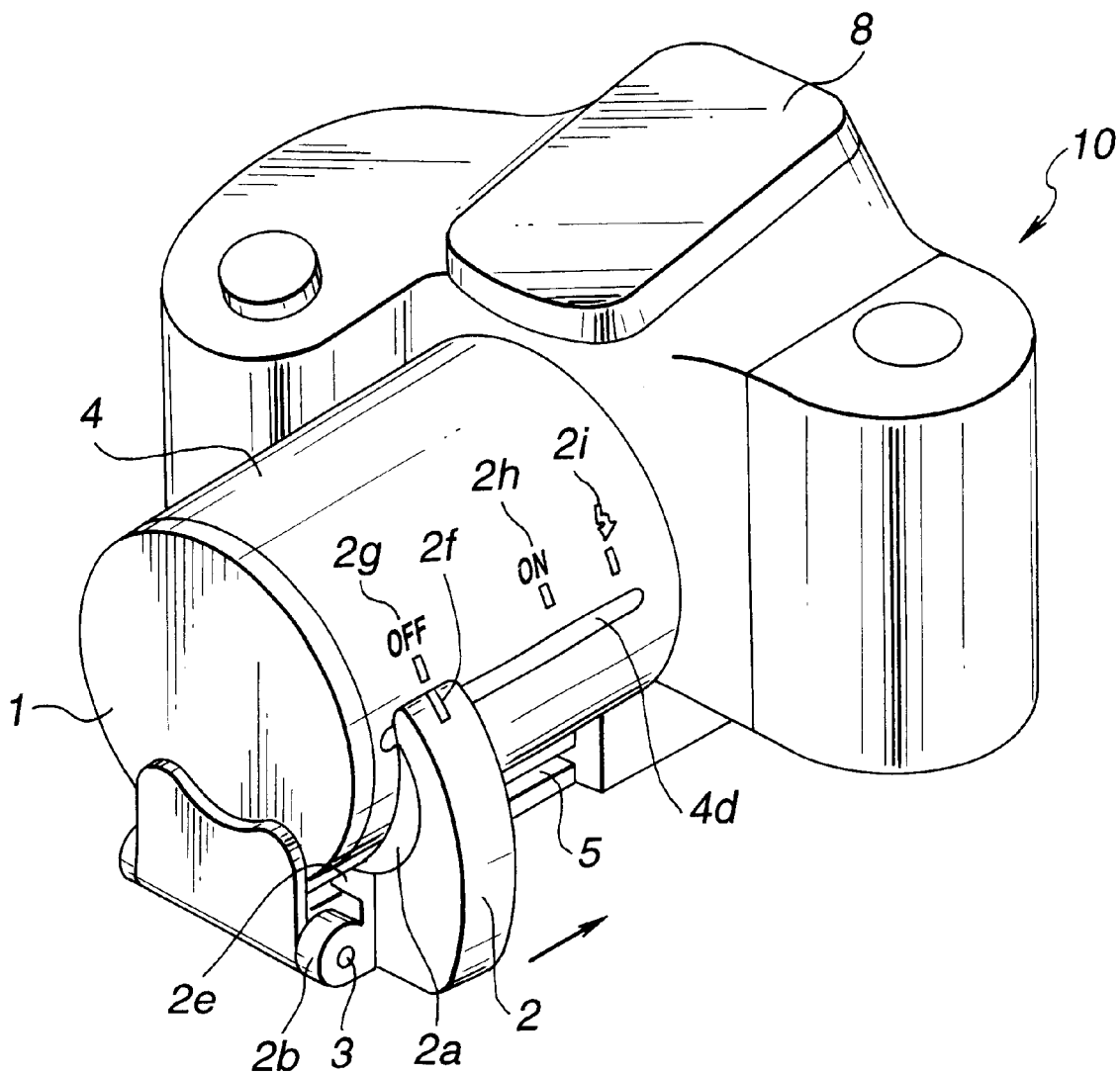
FIG. 1 is a schematic oblique view of a lens protecting cover-attached camera in accordance with a first embodiment of the present invention, showing a state in which a lens protecting cover is located at a closed position with the camera set to a non-photographic state.
Figure 2:
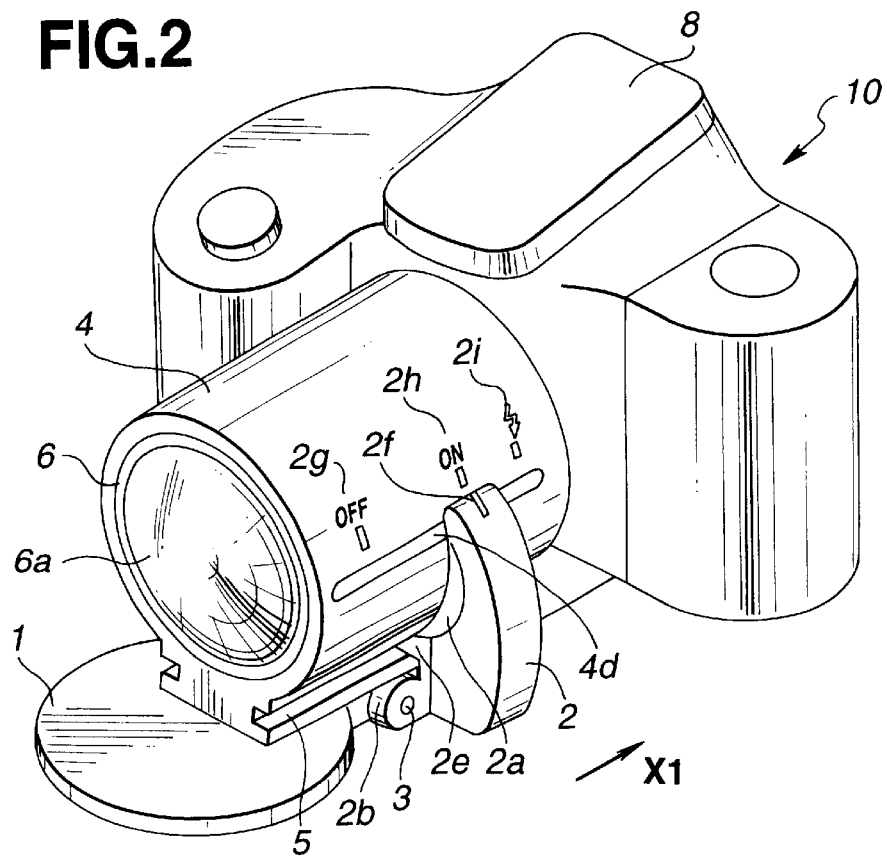
FIG. 2 is a schematic oblique view of the camera shown in FIG. 1 showing a state in which the lens protecting cover is located at an open position with the camera set to a photographic state.
Figure 3:
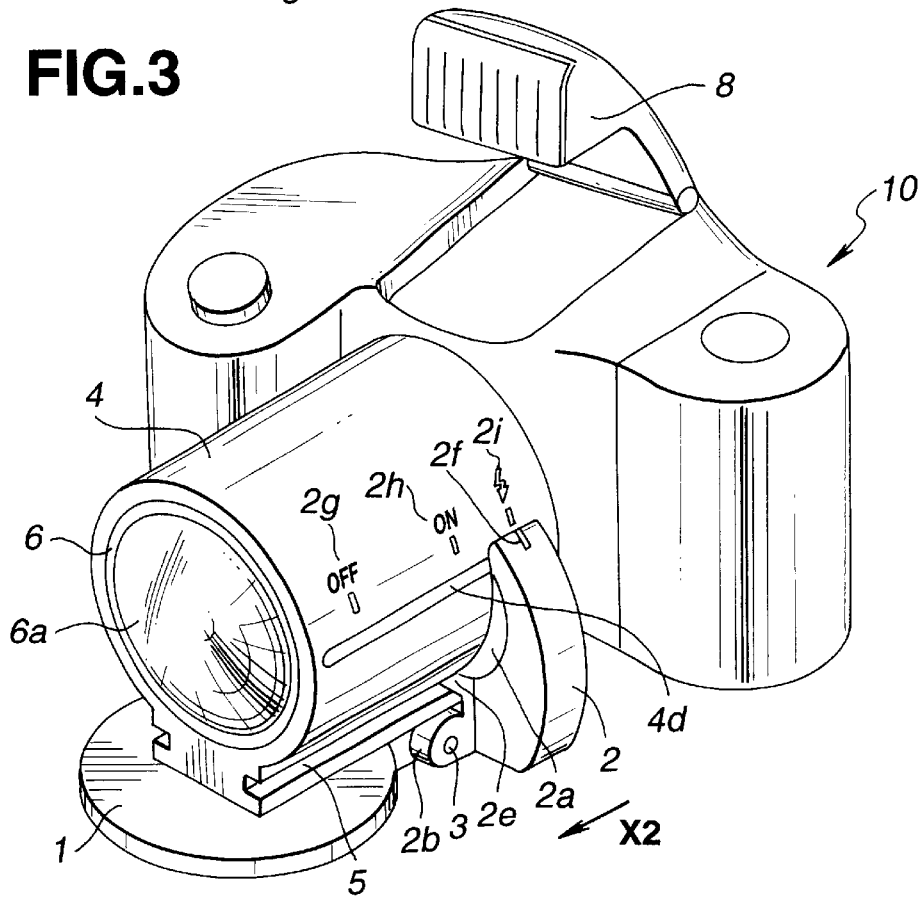
FIG. 3 is a schematic oblique view of the camera shown in FIG. 2 showing a state in which a strobe lighting unit is popped up from the state shown in FIG. 2.

FIG. 1, FIG. 2, and FIG. 3 are schematic oblique views showing a lens protecting cover-attached camera in accordance with a first embodiment of the present invention. FIG. 1 shows the camera in a non-photographic state in which the lens protecting cover is located at a closed position. FIG. 2 shows the camera in a photographic state in which the lens protecting cover is located at an open position. Moreover, FIG. 3 shows the camera in the state shown in FIG. 2 in which a strobe lighting unit is popped up.

Figure 4:
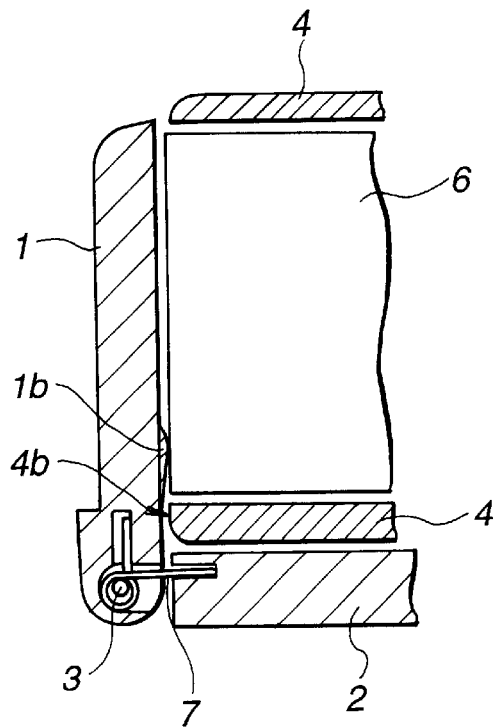
FIG. 4 is a side sectional view of a relevant portion of the camera shown in FIG. 1, showing in enlargement the distal part of a photographic lens and its surroundings, wherein the lens protecting cover is located at the closed position.
Figure 5:
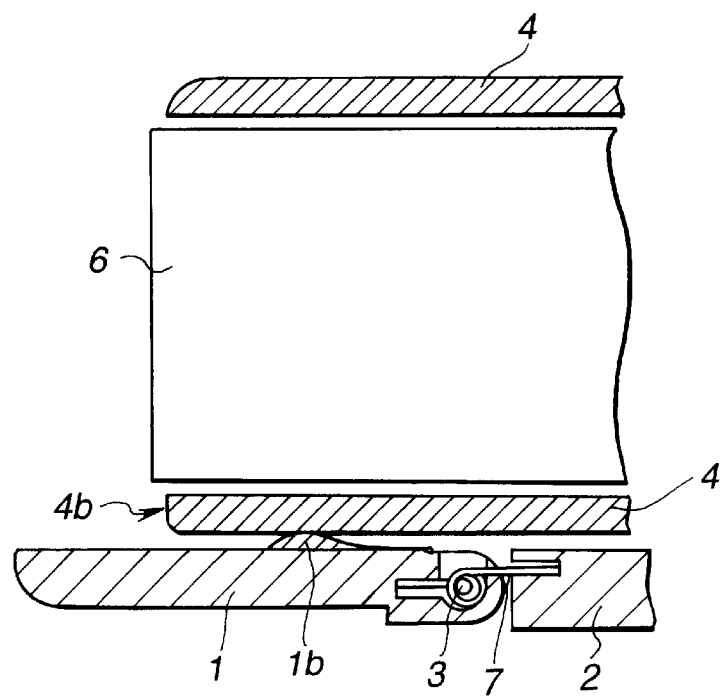
FIG. 5 is a side sectional view of the relevant portion of the camera shown in FIG. 1 showing the distal part of a photographic lens barrel and its surroundings, wherein the lens protecting cover is located at the open position.

FIG. 4 and FIG. 5 are longitudinal sectional views of a relevant portion of the camera showing the distal part of a photographic lens barrel and its surroundings. FIG. 4 shows the distal part of the photographic lens barrel and its surroundings with the lens protecting cover located at the closed position (the state shown in FIG. 1). FIG. 5 shows the distal part of the photographic lens barrel and its surroundings with the lens protecting cover located at the open position (the state shown in FIG. 2 or FIG. 3).

A camera 10 of this embodiment is a single-lens reflex camera having a photographic lens barrel and camera body united with each other therein. Furthermore, the camera includes a pop-up type strobe lighting unit.

In the camera 10, a photographic lens barrel 4 is formed as an integral part of the camera and located substantially in the center of the face of a housing member. A lens holding frame 6 holding a photographic lens 6a is accommodated by the photographic lens barrel 4 so that the lens holding frame 6 can project or retract freely.

A cover open/close groove 5 is formed along the optical axis of the photographic lens 6a on both sides of a pedestal extending downward from the outer circumference of the photographic lens barrel 4. Protrusions 2e of a cover manipulation member 2 are engaged in the cover open/close grooves 5 so that the protrusions 2e can slide freely along the optical axis of the photographic lens 6a. The cover manipulation member 2 supports a lens protecting cover 1 for opening or closing the face of the photographic lens 6a, and drives the lens protecting cover 1 into the open or closed position.

Moreover, a guide groove 4d is formed parallel to the optical axis of the photographic lens 6a at a predetermined position on the outer circumference of the photographic lens barrel 4. A guide pin is attached to the contact surface of the cover manipulation member 2 opposed to the outer circumference of the photographic lens barrel 4. The guide pin is engaged with the guide groove 4d so that the guide pin (not shown) can slide freely therewithin.

As mentioned above, the cover manipulation member 2 is guided to slide along the optical axis of the photographic lens 6a. When the cover manipulation member 2 is slid along the optical axis, the moving mechanism causes the lens protecting cover 1 to open or close and be movable along the optical axis.

The lens protecting cover 1 for opening or closing the face of the photographic lens 6a is attached to the front end of the cover manipulation member 2. The lens protecting cover 1 is supported by a supporting shaft 3 inserted into throughholes bored in respective supporting portions 2b formed on the front end of the cover manipulation member 2. In this state, the lens protecting cover 1 can turn freely. The supporting shaft 3 is placed parallel to a plane substantially perpendicular to the optical axis of the photographic lens 6a. The lens protecting cover 1 has its proximal end engaged with the supporting shaft so that the lens protecting cover can turn freely. The lens protecting cover 1 is moved to a closed position (the state shown in FIG. 1) at which it shields the face of the photographic lens 6a, and to an open position (the state shown in FIG. 2 and FIG. 3) at which it exposes the face thereof. Thus, a nodder-type lens protecting cover is realized.

Specifically, the cover manipulation member 2 causes the lens protecting cover 1 to turn. The cover manipulation member 2 thus causes the face of the photographic lens 6a to become open or closed. Moreover, the cover manipulation member 2 causes the supporting shaft 3 to move along the optical axis of the photographic lens 6a. The cover manipulation member 2 holds the supporting shaft 3. The cover manipulation member 2 moves the supporting shaft 3 selectively in a direction (direction X1 in FIG. 1 and FIG. 2) and an opposite direction (direction X2 in FIG. 3) along the optical axis of the photographic lens 6a.

Moreover, a twisted spring 7 serving as a constraining member is, as shown in FIG. 4 and FIG. 5, wound about the supporting shaft 3. The spring 7 always constrains the lens protecting cover 1 to move to the closed position.

Moreover, a strobe lighting unit 8 that pops up above the top of the camera 10 to a strobe lighting-enabled position is located substantially at the center of the top of the camera 10. The strobe lighting unit 8 is supported by a housing member on the top of the camera 10 so that the strobe lighting unit can turn freely. The strobe lighting unit 8 is moved between an irradiating position (popped-up position) and a stowed position. At the irradiating position, the strobe lighting unit 8 is positioned above the camera 10 so as to be capable of irradiating strobe light. At the stowed position, it is stowed in the camera 10.

On the other hand, the cover manipulation member 2 also serves as a manipulation member. The manipulation member is manipulated to turn on or off the main power switch of the camera 10 and to cause the strobe lighting unit 8 to pop up and thus move to a strobe lighting-enabled position.

When the cover manipulation member 2 is slid in the direction of arrow X1 or X2 along the optical axis of the photographic lens 6a, the cover manipulation member 2 is stopped at a predetermined position within a sliding enabled range due to the operation of a click-stop mechanism (not shown). The click-stop mechanism is provided between the cover open/close grooves 5 and the protrusions 2e of the cover manipulation member 2. When the cover manipulation member 2 is stopped at one of the predetermined positions, an index 2f is aligned with one of the indicators 2g, 2h, or 2i in order to indicate the state of the camera 10. Herein, the index 2f is inscribed at one end near a manipulating portion 2a of the cover manipulation member 2 by, for example, printing, engraving, or any other means. The indicators 2g, 2h, and 2i are illustrations or characters inscribed on the outer circumference of the photographic lens barrel 4 by the same means as used for the index.

The predetermined positions at which the cover manipulation member 2 is stopped by the click-stop mechanism are as follows:

1) a position at which the lens protecting cover 1 is located at the closed position, the camera 10 is set to the non-photographic state, and the main power switch is turned off (the state shown in FIG. 1 in which the index 2f is aligned with the indicator 2g); and 2) a position at which the lens protecting cover 1 is located at the open position, the camera 10 is set to the photographic state, and the main power switch is turned on (the state shown in FIG. 2 in which the index 2f is aligned with the indicator 2h). In a third position at which the lens protecting cover 1 is located at the open position, the camera 10 is set to the photographic state, the main power switch is turned on, and the strobe lighting unit 8 is popped up (the state shown in FIG. 3 in which the index 2f is aligned with the indicator 2i). When the camera 10 of this embodiment is set to the photographic state (the state shown in FIG. 3), the click-stop mechanism is not actuated for stopping the cover manipulation member 2.

The operation of the lens protecting cover 1 of the camera 10 having the foregoing structure will be described below.

Initially the lens protecting cover 1 of the camera 10 is located at the closed position shown in FIG. 1, the index 2f is aligned with the indicator 2g. It is thus indicated that the camera 10 is off. In this case, a user of the camera 10 rests his/her fingers on the manipulating portion 2a of the cover manipulation member 2. The user then slides the cover manipulation member 2 in the direction of arrow X1 in FIG. 1 along the optical axis of the photographic lens 6a. The cover manipulation member 2 then slides in the direction X1 while being guided by the cover open/close grooves 5 and guide groove 4d of the photographic lens barrel 4.

Upon such movement, the lens protecting cover 1 slides in the direction of arrow X1 while pivoting around the supporting shaft 3. Accordingly, a contact boss 1b of the lens protecting cover 1 (see FIG. 4 and FIG. 5) is pushed forward by the front end 4b of the photographic lens barrel 4. This causes the lens protecting cover 1 to turn forward, whereby the face of the photographic lens 6a is exposed. The shape of the contact boss 1b is determined properly so that the lens protecting cover 1 will turn without fail while the contact boss 1b thereof is abutting on the front end 4b of the photographic lens barrel 4.

The lens protecting cover 1 now lies substantially parallel to the optical axis of the photographic lens 6a as shown in FIG. 5. In this state, the cover manipulation member 2 is further slid in the direction of arrow X1. The lens protecting cover 1 is then pulled inward under the bottom of the photographic lens barrel 4. At this time, the contact boss 1b of the lens protecting cover 1 abuts the outer circumference of the photographic lens barrel 4 due to a constraining force exerted by the twisted spring 7. The lens protecting cover 1 slides along the outer circumference.

The cover manipulation member 2 is then stopped at a predetermined position by utilizing the click stop mechanism, which then indicates that the camera is in the state shown in FIG. 2. Specifically, the index 2f is aligned with the indicator 2h, thus indicating that the camera 10 is on (in the photographic state). The lens protecting cover 1 is now fully open.

When the camera 10 is set to the photographic state, the lens holding frame 6 projects slightly out of the photographic lens barrel 4. At this time, the lens holding frame 6 can move along the optical axis of the photographic lens 6a in response to a movement for varying the power of the camera (zooming) or for focusing the camera during photography.

Thereafter, the cover manipulation member 2 is slid in the direction of arrow X1 from the position shown in FIG. 2. The index 2f is then moved to the position of the indicator 2i. The camera 10 shifts to a strobe mode, and the strobe lighting unit 8 moves to the popped-up position.

On the other hand, it may be desired that the lens protecting cover 1 be moved to the closed position at which it shields the face of the photographic lens 6a so that the camera 10 is set to the non-photographic state. In this case, the cover manipulation member 2 is slid in the direction of arrow X2 in FIG. 3 along the optical axis of the photographic lens 6a. The cover manipulation member 2 is guided by the cover open/close grooves 5 and guide groove 4d in the photographic lens barrel 4. Unlike when the lens protecting cover 1 is moved to the open position, the cover manipulation member 2 slides forward. The lens protecting cover 1 is, as mentioned above, biased toward the close position due to the constraining force exerted by the twisted spring 7. When the cover manipulation member 2 is moved to the front end within the sliding-enabled range, the lens protecting cover 1 is brought to the closed position due to a recovering force exerted by the twisted spring 7. At the closed position, the lens protecting cover 1 shields the face of the photographic lens 6a. At the same time, the main power switch is turned off. The index 2f is aligned with the indicator 2g, thus indicating that the camera is set to the non-photographic state.

When the lens protecting cover 1 is moved to the open position is shown in FIG. 2 and FIG. 5, the main power switch is turned on. The camera 10 is set to the photographic state in which photography can be carried out. In this state, the lens protecting cover 1 of the camera 10 has been, as shown in FIG. 2 and FIG. 5, pulled inward under the bottom of the photographic lens barrel 4. Thus open/close mechanism for opening or closing the lens protecting cover 1 is provided on the outside the camera 10.

In the photographic state, a user (photographer) of the camera is often looking through the viewfinder, presenting a possibility that an unexpected extraneous force or the like is applied to the lens protecting cover 1.

Figure 6:
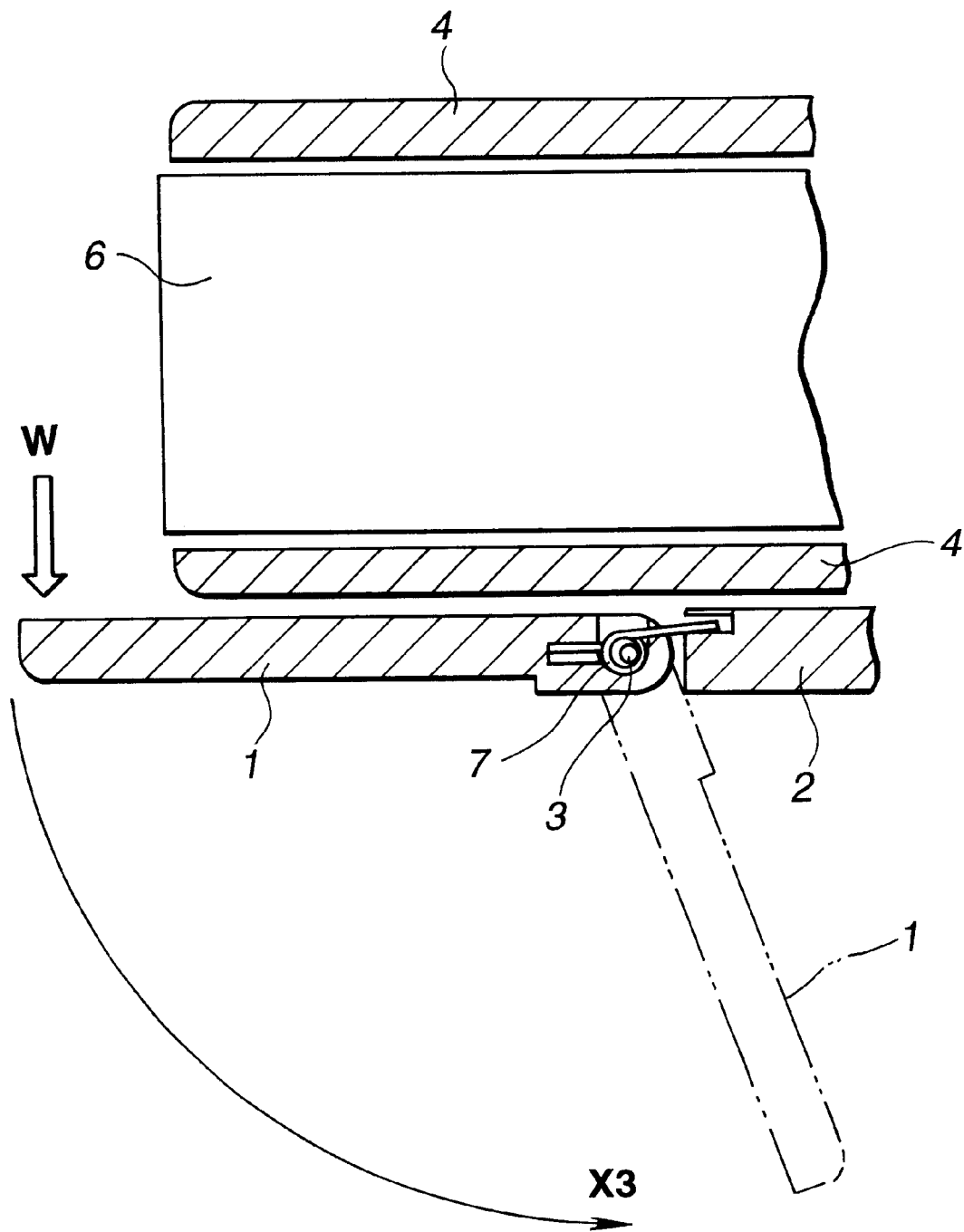
FIG. 6 is a side sectional view of the relevant portion of the camera shown in FIG. 1, showing the distal part of the photographic lens barrel and its surroundings including the lens protecting cover, a supporting mechanism, and their surroundings, wherein the lens protecting cover is located at the open position, and wherein an extraneous force is applied to the distal part of the lens protecting cover.

For example, as shown in FIG. 6, the lens protecting cover 1 is located at the open position and the camera 1 is set to the photographic state. An extraneous force may be applied in a direction W to the distal part of the lens protecting cover 1.

When the lens protecting cover 1 is located at the open position (see FIG. 3 and FIG. 5), an extraneous force or any other load may be applied thereto. In consideration of this possibility, the lens protecting cover 1 of the camera 10 in accordance with this embodiment is designed to be able to turn counterclockwise (direction X3) with the supporting shaft 3 at the center of rotation. In other words, the lens protecting cover 1 can turn as far as to a position indicated with the alternating long and two short dashed line in FIG. 6 against the constraining force of the twisted spring 7.

With this arrangement, when the lens protecting cover 1 is located at the open position, an extraneous force may be applied in the direction W shown in FIG. 6. In this case, the lens protecting cover 1 turns in the direction of arrow X3 to absorb the extraneous force. As soon as the extraneous force is released from the lens protecting cover 1 the cover is reset to the open position indicated with the solid line in FIG. 6 (the same state as that shown in FIG. 5) due to the constraining force of the twisted spring 7.

As mentioned above, according to the first embodiment, in order to bring the lens protecting cover 1 to the open position and set the camera 10 to the photographic state, the lens protecting cover 1 is moved along the optical axis of the photographic lens 6a. This causes the lens protecting cover 1 to turn and pivot forward. The lens protecting cover 1 is then pulled inward under the bottom of the photographic lens barrel 4. The extent by which the lens protecting cover 1 projects ahead of the photographic lens barrel 4 can be reduced in an alternative and a simple structure. This leads to a reduction in the likelihood of an incident attributable to an extraneous force, impact, or the like being applied to the lens protecting cover 1 while the camera 10 is in use. For example, the likelihood an incident such as a breakage or failure of the lens protecting cover 1 or camera 10 is reduced.

Moreover, the lens protecting cover 1 is constrained toward the closed position by means of the twisted spring 7, and the lens protecting cover 1 can turn within a large range. Even if an extraneous force, impact, or the like is applied to the lens protecting cover 1, the likelihood of breakage of the lens protecting cover 1 can be prevented.

Furthermore, the mechanism for opening or closing the lens protecting cover 1 is constructed with a simple structure. The open/close mechanism is located outside the camera 10 such that it will not hinder photography, that is, on the bottom of the photographic lens barrel 4 formed on the face of the camera 10. The lens protecting cover 10 will therefore not affect the internal components of the camera 10. The space to be occupied by the internal components can therefore be saved, which contributes to a compact camera design.

Figure 7:
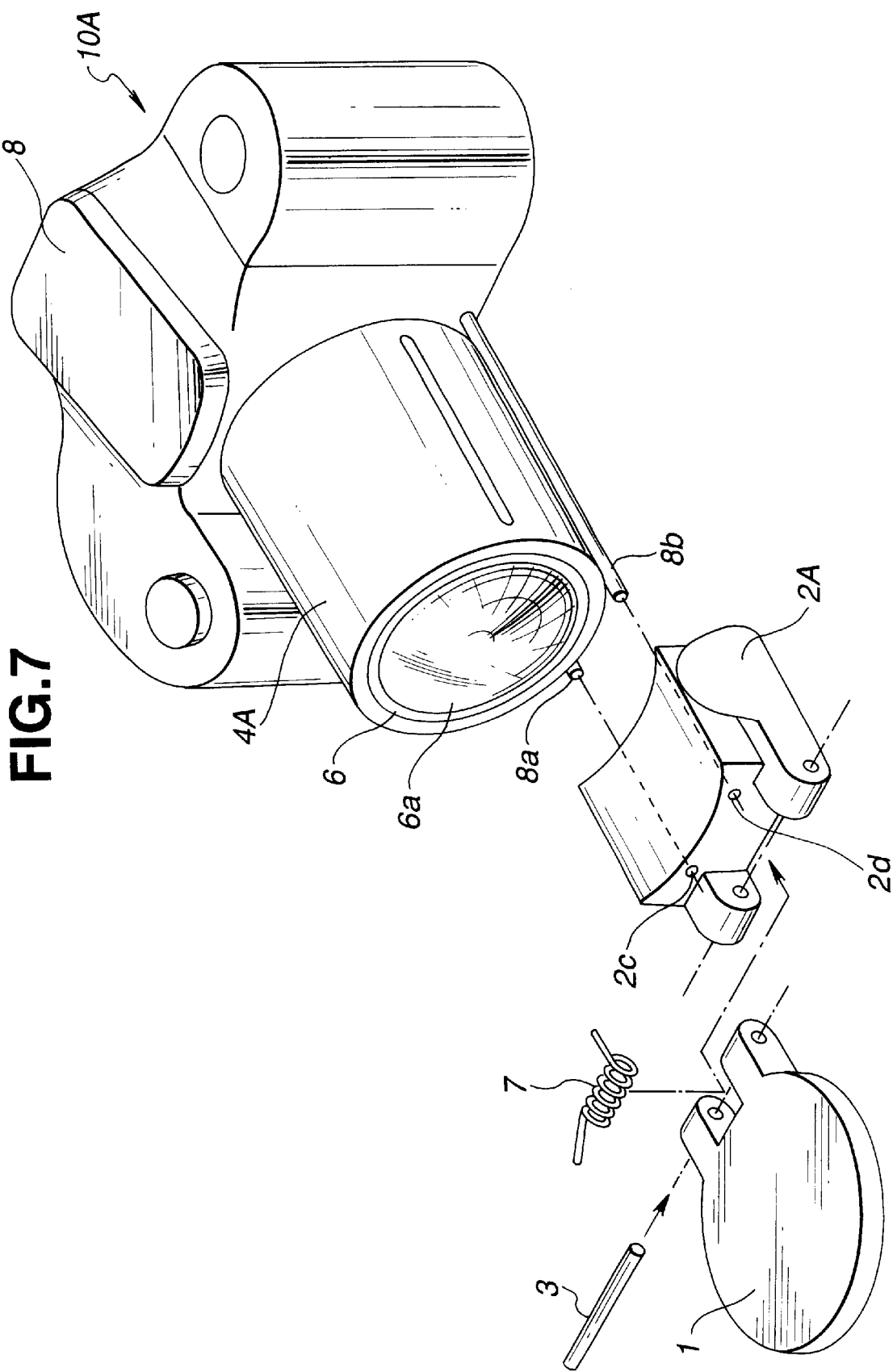
FIG. 7 is an exploded oblique view showing the structure of a lens protecting cover-attached camera in accordance with a second embodiment of the present invention.

FIG. 7 is an exploded oblique view showing the structure of a lens protecting cover-attached camera in accordance with a second embodiment of the present invention. The camera of this embodiment has fundamentally the same components as the aforesaid camera of the first embodiment. The same reference numerals will be assigned to the component members identical to those of the aforesaid first embodiment. The description of those components will therefore be omitted. Only the different members will be described below.

A photographic lens barrel 4A of a camera 10A in accordance with this embodiment is not provided with the pedestal and cover open/close grooves 5, which are provided in the first embodiment. Instead, cover sliding shafts 8a and 8b constituting a supporting mechanism are implanted beneath the lower part of the photographic lens barrel 4A, that is, the lower part of the face of the housing member of the camera 10A. The cover sliding shafts 8a and 8b extend forward so as to be parallel to the optical axis of the photographic lens 6a. The cover sliding shafts 8a and 8b are fitted into through-holes 2c and 2d bored in a cover manipulation member 2A. The cover manipulation member 2A can freely slide along the optical axis of the photographic lens 6a on the bottom of the photographic lens barrel 4A.

Moreover, the lens protecting cover 1 is, like the one in the aforesaid first embodiment, attached to the front end of the cover manipulation member 2A. The lens protecting cover 1 can turn freely with respect to the supporting shaft 3 that is oriented parallel to a plane substantially perpendicular to the optical axis of the photographic lens 6a. The lens protecting cover 1 is always constrained toward the closed position by means of the twisted spring 7. The other components and operations are identical to those of the first embodiment.

The second embodiment having the foregoing structure can provide the same advantages as the first embodiment. Moreover, in this embodiment, the cover sliding shafts 8a and 8b are merely implanted in the housing member forming the face of the camera. The cover sliding shafts 8a and 8b support the cover manipulation member 2A so that the cover manipulation member 2A can slide freely. This embodiment can be implemented in any existing camera at low cost.

Next, a lens protecting cover-attached camera of a third embodiment of the present invention will be described below.

Figure 8:
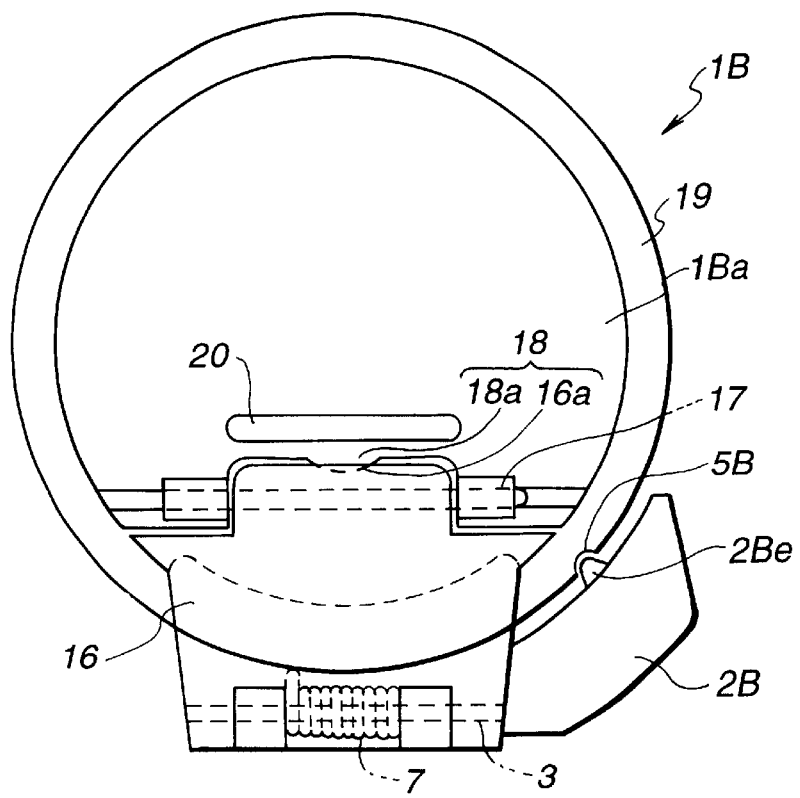
FIG. 8 is an enlarged front view of a relevant portion of a lens protecting cover-attached camera in accordance with a third embodiment of the present invention, showing partly a lens protecting cover and its supporting mechanism.
Figure 9:
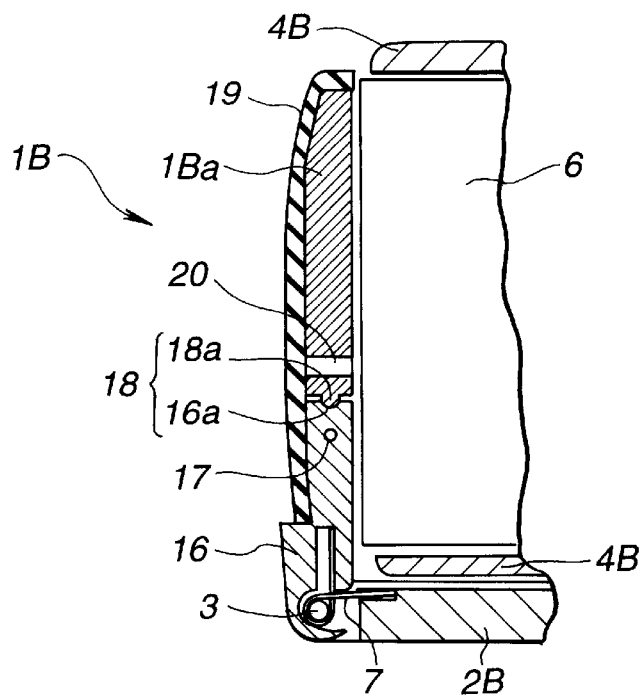
FIG. 9 is a side sectional view of the relevant portion of the camera shown in FIG. 8, showing in enlargement the lens protecting cover, its supporting mechanism, and their surroundings.

FIG. 8 is an enlarged front view of a relevant portion of the camera of this embodiment, partly showing a lens protecting cover and a supporting mechanism. FIG. 9 is a side sectional view of the relevant portion of the camera showing in enlargement the lens protecting cover, the supporting mechanism, and their surroundings. Additionally, FIG. 8 shows a state in which the lens protecting cover 1B is seen from the side thereof opposed to the photographic lens 6a. Moreover, FIG. 9 shows a state in which the lens protecting cover 1B is located at the closed position and the camera is set to the non-photographic state. The camera of this embodiment has fundamentally the same components as the camera of the first embodiment. A difference between the two embodiments is found in the lens protecting cover and the supporting mechanism for supporting the lens protecting cover. The same reference numerals will be assigned to the component members identical to those of the first embodiment. The description of those components will therefore be omitted. Only the different members will be described below.

A lens protecting cover 1B of the camera of this embodiment is composed of a cover member 1Ba and a hinge member 16. The cover member and hinge member are coupled to each other via a hinge shaft 17 that is a second supporting shaft so that they can turn freely. When the cover member and hinge member are thus coupled to each other, they appear substantially like a disk. Their coupler is a click mechanism 18 composed of a click boss 18a and a click groove 16a. The click boss 18a is a convex part of the cover member 1Ba, and the click groove 16a is a concave part on one margin of the hinge member 16. The click boss and click groove are stopped turning by the click mechanism 18 (which will be detailed later).

Moreover, the hinge member 16 is supported by a cover manipulation member 2B via the supporting shaft 3 in such a manner the hinge member 16 can turn freely. The lens protecting cover 1B is always constrained toward the closed position for shielding the face of the photographic lens due to a constraining force exerted by the twisted spring 7 wound about the supporting shaft 3.

The cover manipulation member 2B has a projection 2Be on the side thereof opposed to the outer circumference of the photographic lens barrel 4B. A cover open/close groove 5B is bored at a position in the outer circumference of the photographic lens barrel 4B at which the cover open/close groove 5B is opposed to the projection 2Be. The projection 2Be is engaged with the cover open/close groove 5B. The cover manipulation member 2B is thus guided by the cover open/close groove 5B to slide along the optical axis of the photographic lens.

Now, the click mechanism 18 will be described in conjunction with the enlarged view of the relevant portion of FIG. 10.

Figure 10:
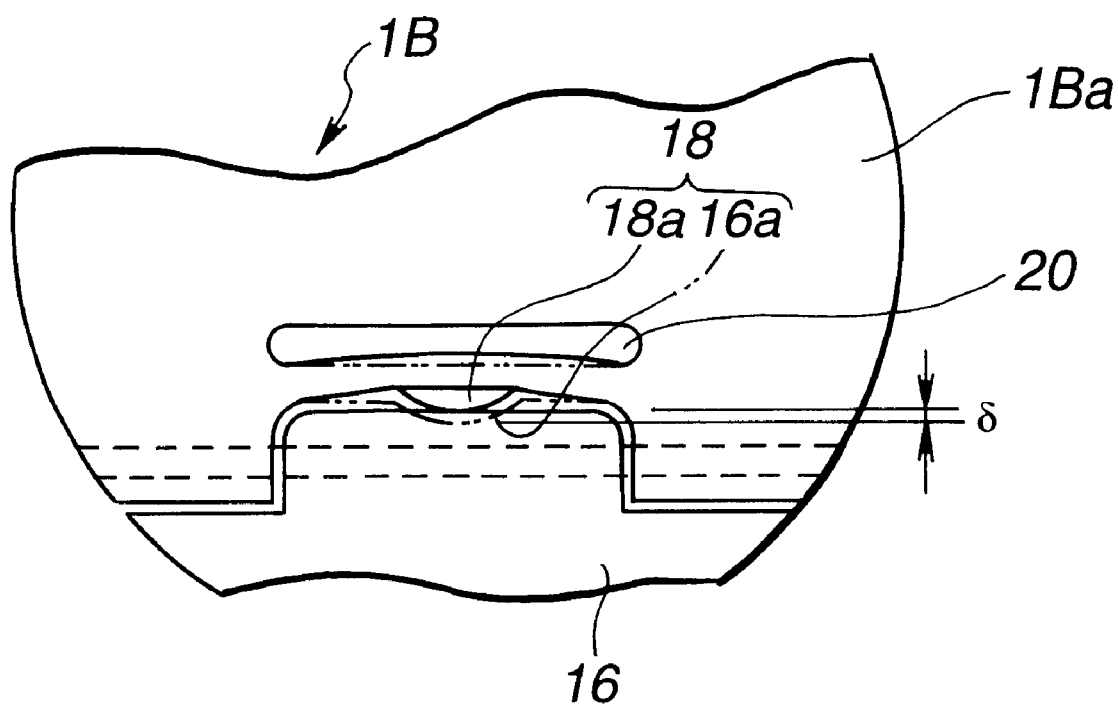
FIG. 10 is an enlarged view of the relevant portion of the camera shown in FIG. 8 showing a click mechanism of the lens protecting cover and its surroundings.

FIG. 10 is an enlarged view of the relevant portion showing the surroundings of the click mechanism 18 of the lens protecting cover 1B. To prevent the drawing from becoming complicated, FIG. 10 does not show a cover rubber 19 that will be described later.

The cover member 1Ba is made of, for example, a material such as a synthetic resin. The click boss 18a that is a convex part and an elongated hole 20 are formed near one margin of the cover member 1Ba at which the cover member 1Ba is coupled to the hinge member 16.

On the other hand, the click groove 16a that is a concave part is formed at a position on the hinge member 16 opposed to the position of the click boss 18a. The click boss 18a is engaged with the click groove 16a, whereby the cover member 1Ba is locked in the hinge member 16. The click mechanism 18 is thus constructed as a synthetic resin spring.

If an extraneous force is applied to the cover member 1Ba, the click boss 18a is disengaged from the click groove 16a along the inner wall surface of the click groove. In other words, the click boss 18a is provided with elasticity by the elongated hole 20. With an extraneous force, the click boss deforms by a magnitude proportional to a warp δ shown in FIG. 10. Consequently, the click boss 18a is unlocked from the click groove 16a. The cover member 1Ba pivots around the hinge shaft 17.

After the cover member 1Ba and hinge member 16 are coupled to each other, a cover rubber 19 is affixed to entirely cover the faces of the cover member 1Ba and hinge member 16. Even when the cover member 1Ba is unlocked from the click mechanism 18, it will not come off.

Figure 11:
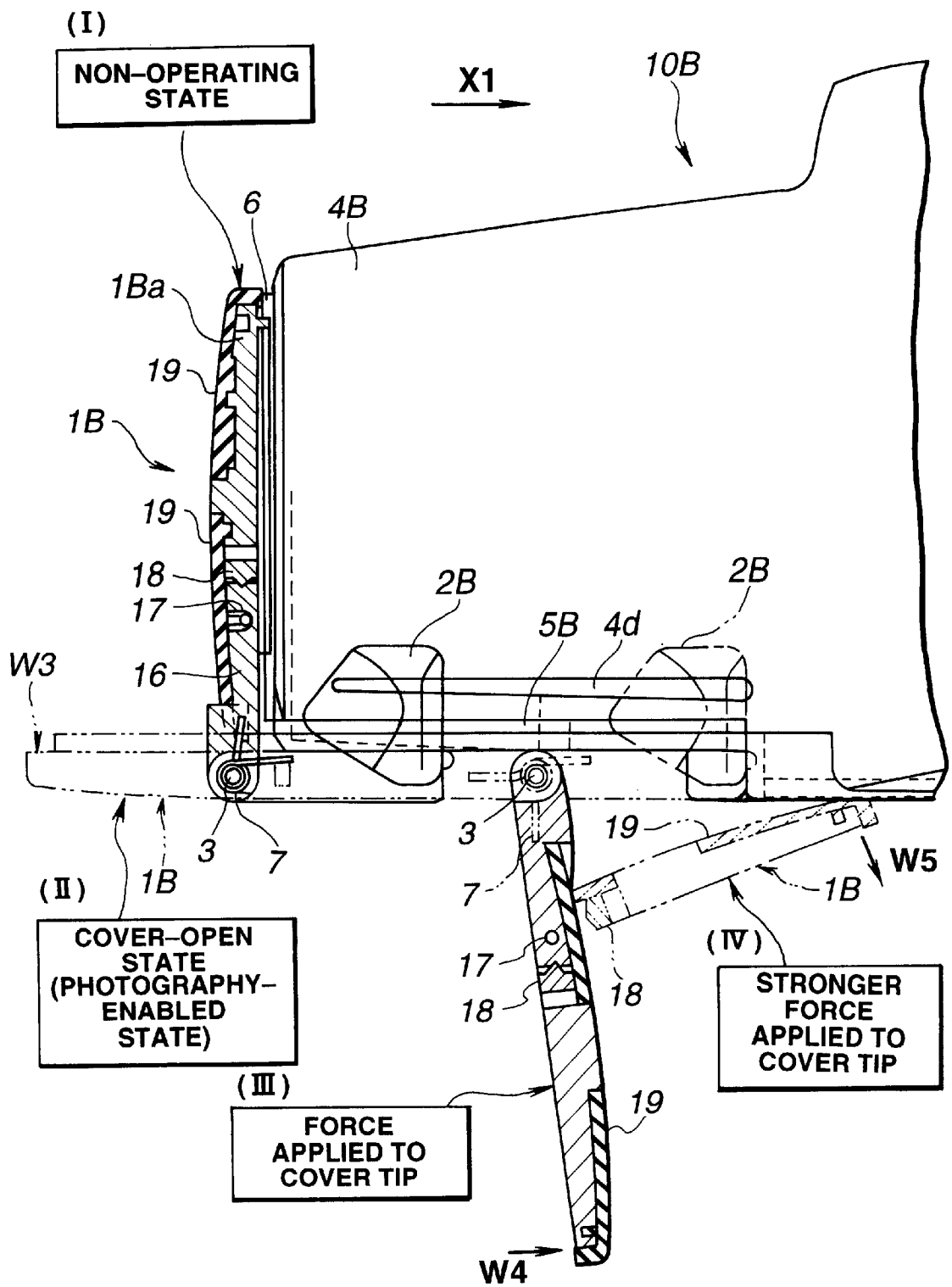
FIG. 11 is a diagram of the relevant portion of the camera shown in FIG. 8 showing a photographic lens barrel, lens protecting cover, and their surroundings in enlargement, wherein the camera is seen from one side thereof in various state including state in which the camera is set to a non-operating state, a state with the cover open (with the camera set to a photography-enabled state), a state in which a force is applied to the cover tip, and a state in which a stronger force is applied thereto are illustrated.

FIG. 11 is an enlarged view of the relevant portion showing in enlargement the photographic lens barrel, the lens protecting cover, and their surroundings, wherein the camera of this embodiment is seen from one side thereof. The various positions of the lens protecting cover resulting from different degrees of movement are indicated with solid lines or alternating long and two short dashed lines. The operations of the camera of this embodiment will be described below.

In FIG. 11, a state (I) is a state in which the camera 10B is set to the non-photographic state (non-operating state) and the lens protecting cover 1B is located at the closed position at which it shields the face of the photographic lens. In this state, the lens protecting cover 1B abuts the distal part of the lens holding frame 6 due to a constraining force exerted by the twisted spring 7. The lens protecting cover 1B is thus held at the closed position.

In the state (I) shown in FIG. 11, the cover manipulation member 2B is slid along the cover open/close groove 5B and guide groove 4d in the direction of arrow X1 along the optical axis of the photographic lens. The cover manipulation member is thus moved to a position (II) in FIG. 11 indicated with the alternating long and two short dashed line. At this time, the lens protecting cover 1B turns with the supporting shaft 3 as a center response to the sliding of the cover manipulation member 2B. The lens protecting cover 1B is then pulled inward under the bottom of the photographic lens barrel 4B. The camera 10B is then set to the photographic state. The lens protecting cover 1B exposes the face of the photographic lens. Due to the operation of the click stop mechanism, the lens protecting cover 1B is retained at the position (II) in FIG. 11. In this position, the camera 101B is set to the photography-enabled state, and the lens protecting cover 1s is located at the open position (cover open state) at which it exposes the face of the photographic lens.

In the state (II), when an unexpected extraneous force W3 is applied to the distal part of the lens protecting cover 1B, the lens protecting cover 1B turns with the supporting shaft 3 as a center against the constraining force of the twisted spring 7 until it reaches a state (III) indicated with a solid line in FIG. 11. The lens protecting cover 1B thus absorbs the extraneous force W3. In the state (III), when the extraneous force W3 is released from the lens protecting cover 1B, the cover is reset to the open position due to the constraining force of the twisted spring 7.

As shown in FIG. 11, when a stronger extraneous force W4 is applied to the distal part of the lens protecting cover 1B, the cover member 1Ba is, as described above, unlocked from the click mechanism 18. The cover member 1Ba then turns with the hinge shaft 17 as a center. Consequently, the cover member 1Ba reaches a state (IV) shown in FIG. 11, in which the distal part of the cover member 1Ba abuts the bottom of the photographic lens barrel 4B.

In this state, a user applies an extraneous force to the distal part of the cover member 1Ba in the direction of arrow W5 with his/her finger or the like. This causes the cover member 1Ba to turn. The cover member 1Ba is then locked by the click mechanism 18 again. Thus, the cover member 1Ba can be reset to the original state.

As mentioned above, the third embodiment can provide the same advantages as the first embodiment. Moreover, further safety can be guaranteed against an incident stemming from an extraneous force or impact applied to the lens protecting cover 1B without the necessity of increasing the size of camera.

The supporting mechanism employed in the second embodiment may be adopted as a supporting mechanism for supporting the lens protecting cover 1B in this embodiment.

Next, a lens protecting cover-attached camera of a fourth embodiment of the present invention will be described below.

Figure 12:
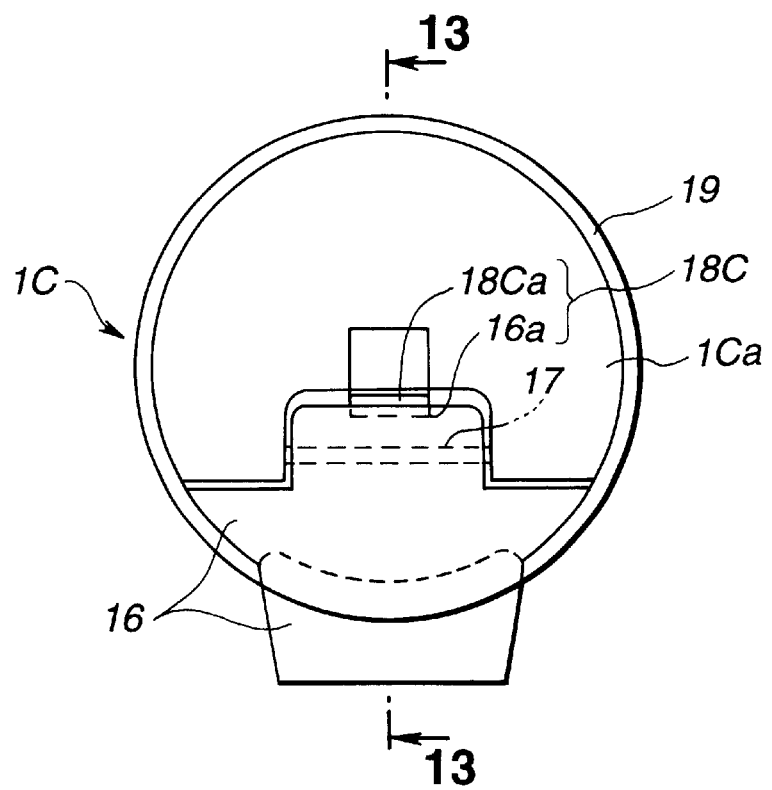
FIG. 12 is a front view of a relevant portion of a lens protecting cover-attached camera in accordance with a fourth embodiment of the present invention, showing a lens protecting cover alone as seen from the side thereof abutting on a photographic lens.
Figure 13:
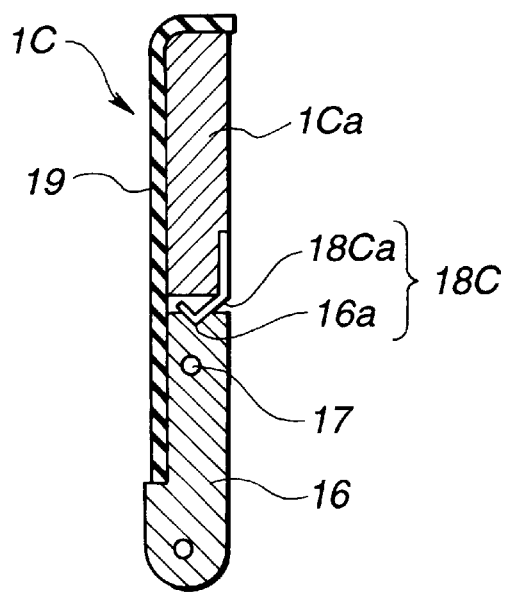
FIG. 13 is a longitudinal cross-sectional view of the center 13—13 cutting plane of the lens protecting cover shown in FIG. 12.

FIG. 12 is a front view of a relevant portion of the camera of this embodiment showing a lens protecting cover alone, wherein the lens protecting cover is seen from the side thereof abutting a photographic lens. FIG. 13 is a cross-sectional view of the 13—13 cutting plane of the lens protecting cover shown in FIG. 12, that is, a longitudinal cross sectional view of the center plane of the lens protecting cover.

The camera of this embodiment has fundamentally substantially the same components as the cameras of the aforesaid embodiments. The only difference lies in the structure of the lens protecting cover. Specifically, a lens protecting cover 1C in the camera of this embodiment is formed by coupling a cover member 1Ca to the hinge member 16 using a click mechanism 18C in the same manner as in the third embodiment.

The click mechanism 18C is located near one margin of the cover member 1Ca, and composed of a click boss 18Ca and a click groove 16a. The click boss 18Ca is realized with a blade spring having elasticity. The click groove 16a is a concave part of the hinge member 16 on one margin thereof. The cover member 1Ca and hinge member 16 are stopped turning by the click mechanism 18C.

The fourth embodiment having the foregoing structure can provide the same advantages as the third embodiment.

Next, a lens protecting cover-attached camera of a fifth embodiment of the present invention will be described below.

Figure 14:
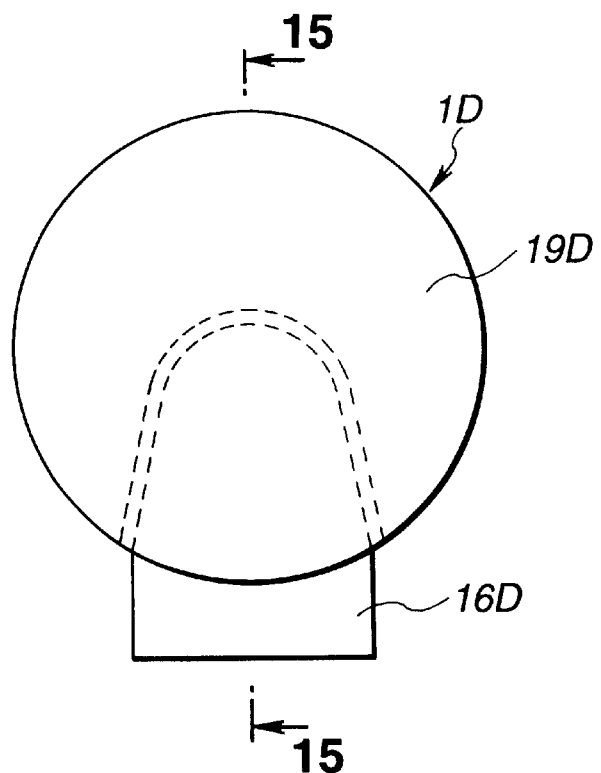
FIG. 14 is a front view of a relevant portion of a lens protecting cover-attached camera in accordance with a fifth embodiment of the present invention, showing a lens protecting cover alone.
Figure 15:
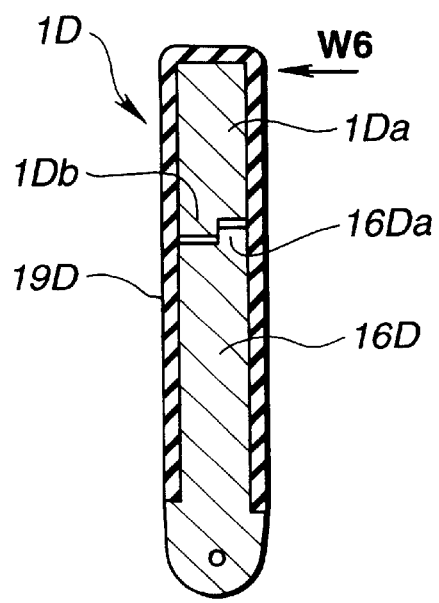
FIG. 15 is a longitudinal cross-sectional view of the 15—15 cutting plane of the lens protecting cover shown in FIG. 14.

FIG. 14 is a front view of a relevant portion of the camera of this embodiment showing a lens protecting cover alone. FIG. 15 is a cross-sectional view of the 15—15 cutting plane of the lens protecting cover shown in FIG. 14, that is, a longitudinal front view of the center plane of the lens protecting cover.

The camera of this embodiment fundamentally has substantially the same components as the cameras of the aforesaid embodiments. The only difference lies in the structure of the lens protecting cover.

The lens protecting cover 1D in the camera of this embodiment is formed by coupling a cover member 1Da to a hinge member 16D. The cover member 1Da and hinge member 16D are coupled to each other by engaging stepped portions 1Db and 16Da, which are formed on one margin of each of the cover member and hinge member. The coupled cover member 1Da and hinge member 16D are entirely covered by a cover rubber 19D.

The coupler made up of the stepped portions 1Da and 16Da serves as a click mechanism. When an extraneous force is applied in the direction of arrow W6 in FIG. 15, the cover rubber 19D deforms elastically. The stepped portions 1Db and 16Da are then disengaged from each other. Consequently, the cover member and hinge member are uncoupled from each other. At this time, since the cover rubber 19D entirely covers the cover member 1Da and hinge member 16D, the cover member 1Da will not come off from the hinge member 16D. The other components are substantially identical to those of the aforesaid embodiments.

The foregoing structure can provide the same advantages as the third embodiment.

Next, a lens protecting cover-attached camera of a sixth embodiment of the present invention will be described below.

Figure 16:
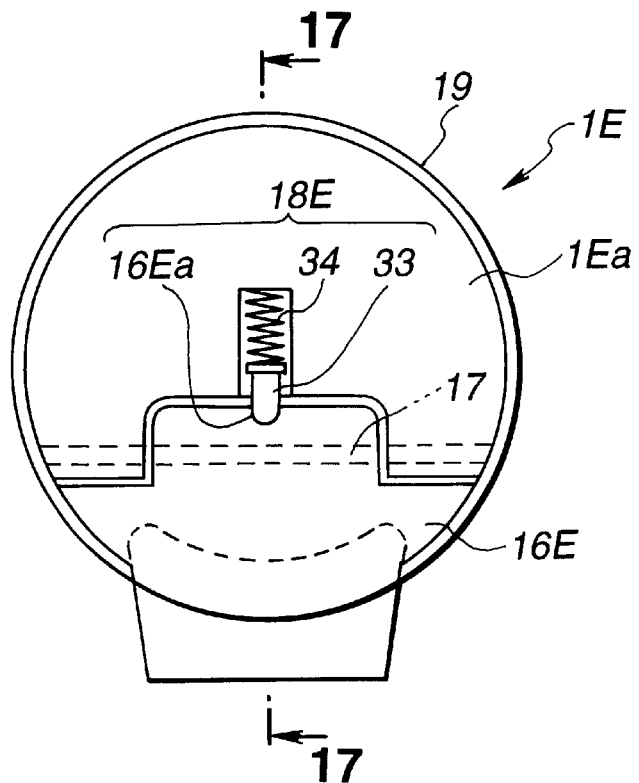
FIG. 16 is a front view of a relevant portion of a lens protecting cover-attached camera in accordance with a sixth embodiment of the present invention, showing a lens protecting cover alone as seen from the side thereof abutting on a photographic lens.
Figure 17:
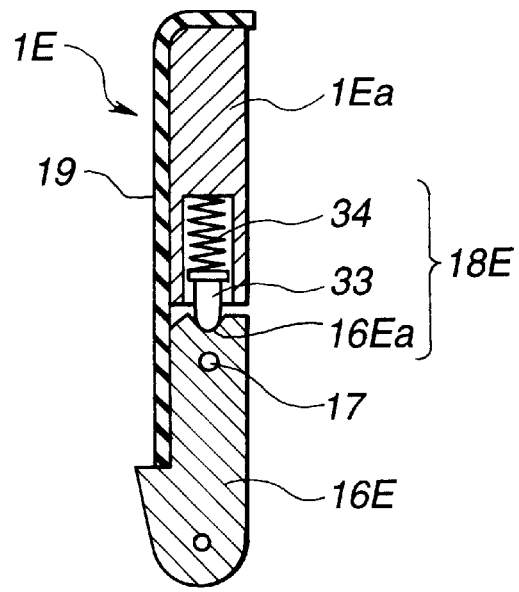
FIG. 17 is a longitudinal cross-sectional view of the center 17—17 cutting plane of a lens protecting cover shown in FIG. 16.

FIG. 16 is a front view of a relevant portion of the camera of this embodiment showing a lens protecting cover alone, wherein the lens protecting cover is seen from the side thereof abutting the photographic lens. FIG. 17 is a cross-sectional view of the 17—17 cutting plane of the lens protecting cover shown in FIG. 16, that is, a longitudinal cross-sectional view of the center plane of the lens protecting cover.

The camera of this embodiment fundamentally has substantially the same components as the cameras of the aforesaid embodiments. The only a difference lies in the structure of the lens protecting cover.

The lens protecting cover BE in the camera of this embodiment is, like the one in the third embodiment, formed by coupling a cover member 1Ea to a hinge member 16E using a click mechanism 18E. The click mechanism 18E is located near one margin of the cover member 1Ea, and composed of a click pin 33 and a click groove 16Ea. The click pin 33 is constrained by a click spring 34 that is a stretchable coil spring or the like. The click groove 16Ea is a concave part of the hinge member 16E on one margin thereof.

The margin of the hinge member 16E near the click groove 16Ea, with which the click pin 33 is engaged, is formed to have, for example, a spherical section. In other words, the margin of the hinge member 16E is formed so that the click pin 33 can smoothly be engaged with or disengaged from the click groove 16Ea. The cover member 1E*a* and hinge member 16E are stopped turning by the click mechanism 18E. The other components are substantially identical to those of the aforesaid embodiments.

The foregoing structure can provide the same advantages as the third embodiment.

In the cameras of the embodiments described above, the index 2*f* is aligned with the indicator 2*h* (see FIG. 2) by sliding the cover manipulation member. The main power switch is thus turned on. A pop-up mechanism can be actuated in response to further sliding of the cover manipulation member 2. The pop-up mechanism causes the strobe lighting unit 8 to pop up above the top of the camera body and to thus move to a strobe lighting-enabled position (popped-up position).

Now, a description will be made of the strobe pop-up mechanism for popping up the strobe lighting unit in response to a movement of sliding the cover manipulation member.

Figure 18:
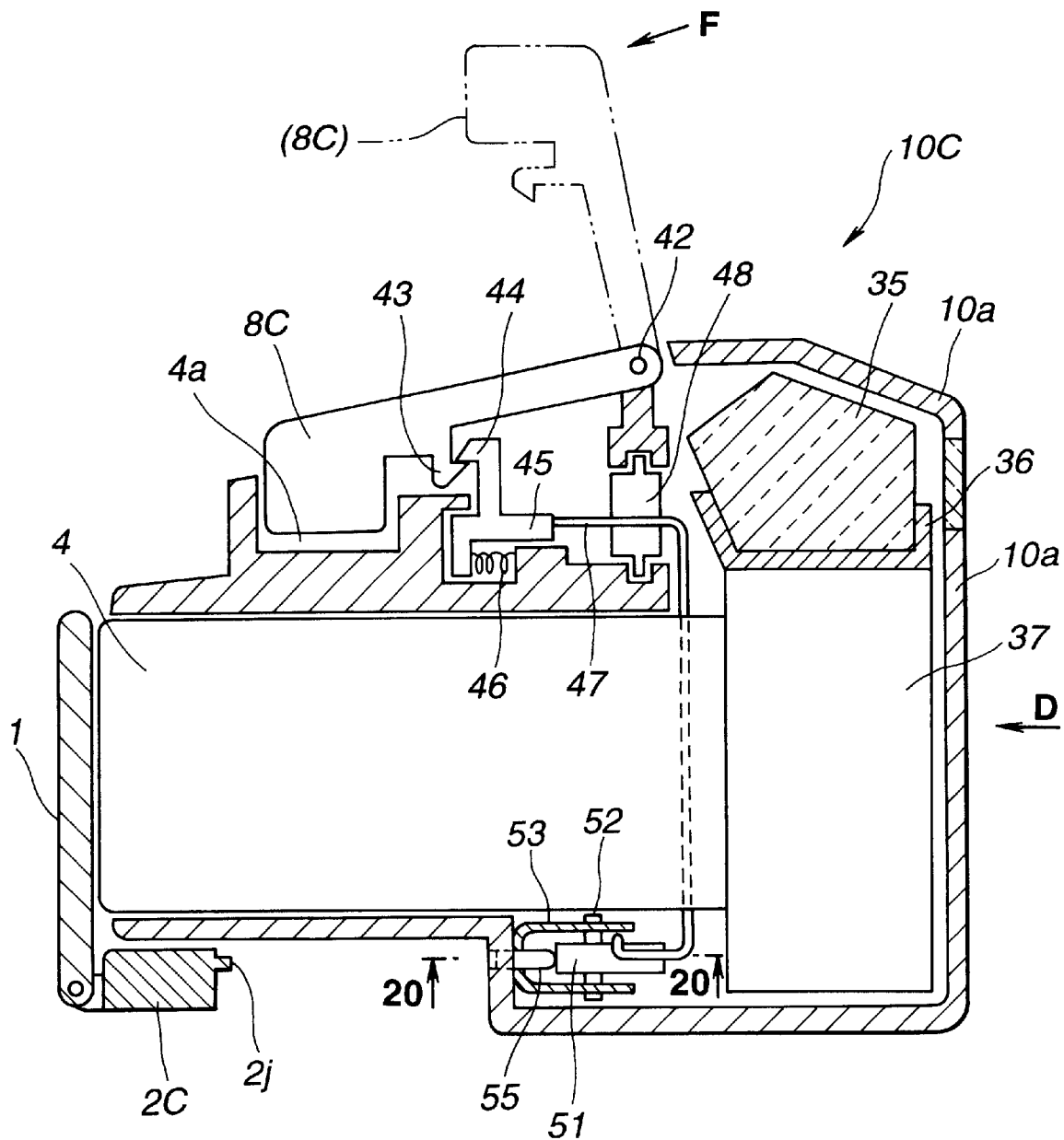
FIG. 18 is a longitudinal cross-sectional view of the center cutting plane of a lens protecting cover-attached camera in accordance with a seventh embodiment of the present invention.
Figure 19:
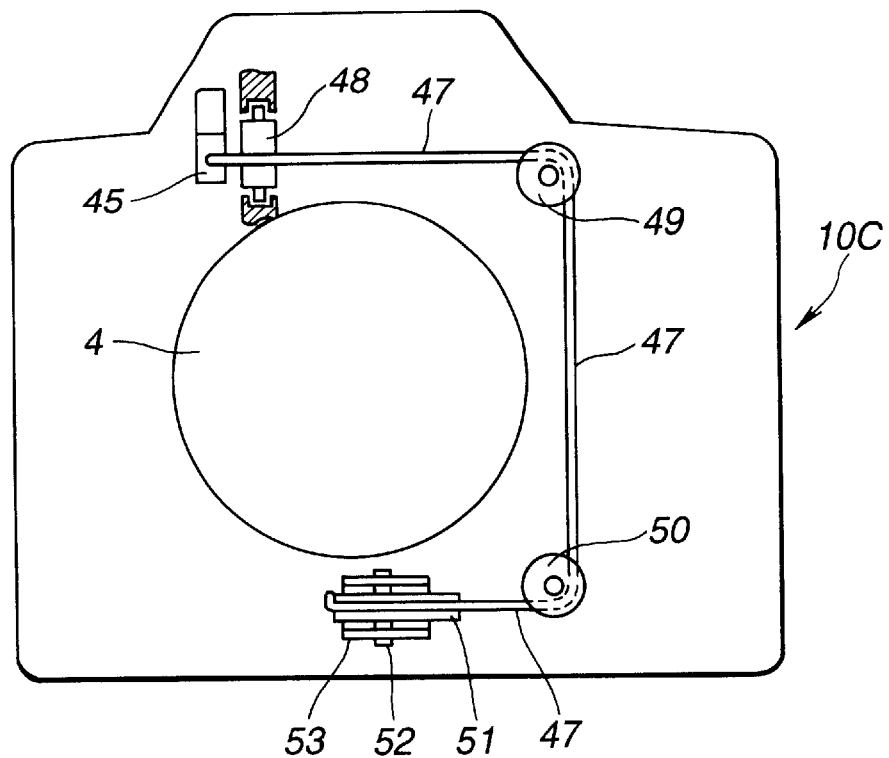
FIG. 19 is a schematic diagram of the structure of a strobe pop-up mechanism seen from the back of the camera shown in FIG. 18.
Figure 20:
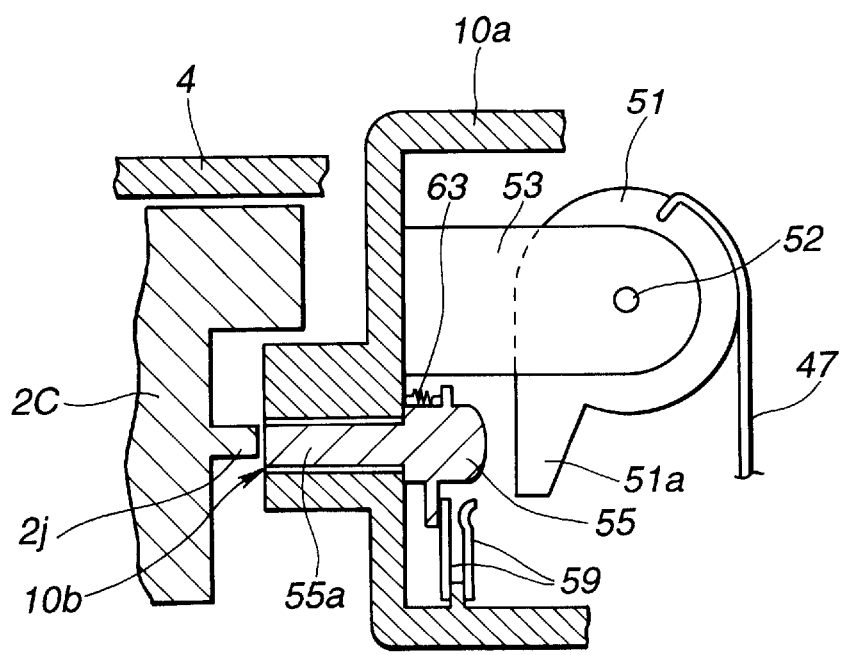
FIG. 20 is an enlarged cross-sectional view of the 20—20 cutting plane of a relevant portion of the camera shown in FIG. 18, showing a strobe pop-up mechanism in a state in which the lens protecting cover is located at the open position and the main power switch is turned off.
Figure 21:
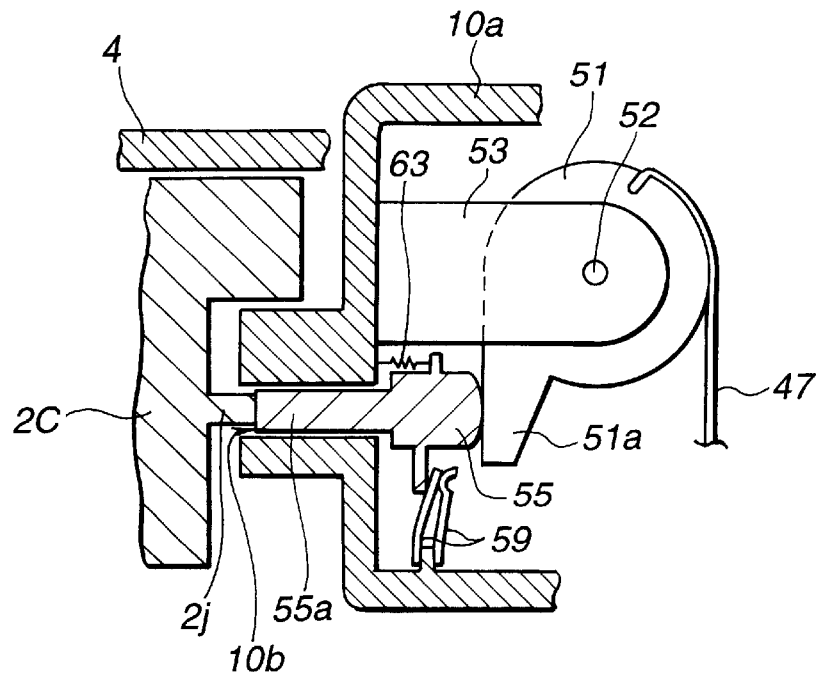
Figure 22:
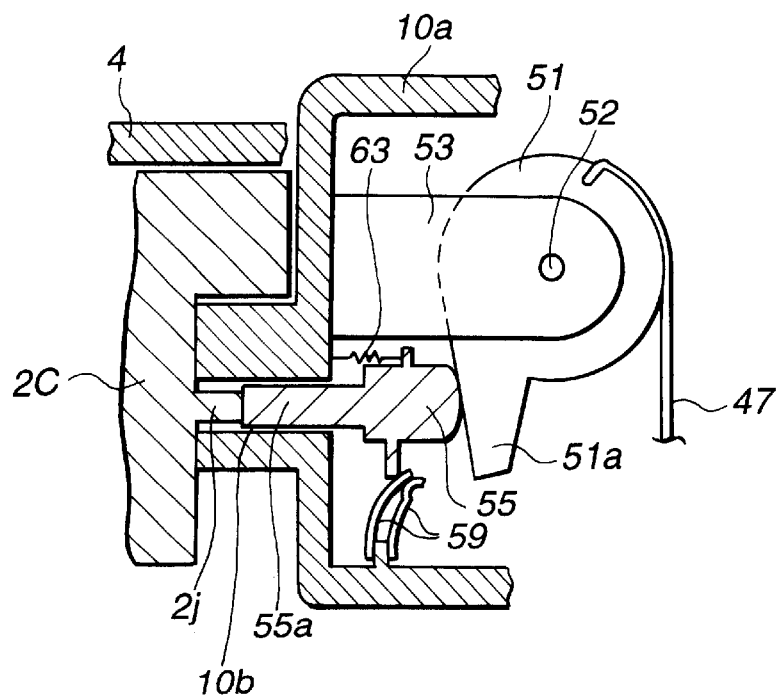
FIG. 22 is an enlarged cross-sectional view of the 20—20 cutting plane of the relevant portion of the camera shown in FIG. 18, showing the strobe pop-up mechanism in a state in which the lens protecting cover is located at the open position, the main power switch is turned on, and the strobe lighting unit is popped up.

FIG. 18 is a longitudinal cross-sectional view of the center plane of a lens protecting cover-attached camera of a seventh embodiment of the present invention. FIG. 19 is a schematic view of the structure of the strobe pop-up mechanism seen from the back of the camera (in the direction of arrow D in FIG. 18). FIG. 20, FIG. 21, and FIG. 22 are enlarged cross-sectional views of the 20—20 cutting plane of a relevant portion of the camera shown in FIG. 18. Shown in the drawings are the states of the relevant portion resulting from movements of the strobe pop-up mechanism in response to manipulations of the cover manipulation member of the camera. To prevent the drawings from becoming complicated, the strobe pop-up mechanism is mainly illustrated, and the other components are not shown.

As shown in FIG. 18, the camera 10C is formed by uniting a housing member 10*a* with a photographic lens barrel 4. The housing member 10*a* accommodates component members including a camera body 37 and viewfinder optical system. The photographic lens barrel 4 is formed to project ahead of the housing member 10*a*. A photographic lens and other component members are stowed in the photographic lens barrel 4. A strobe lighting unit 8C is located on the top of the camera 10C so that it can pivot freely around a shaft member 42. The strobe lighting unit 8C can move between an irradiating position (popped-up position) at which it is popped up from the camera 10C and can emit light, and a stowed position at which it is stowed in the camera 10C.

The viewfinder optical system is composed of a pentagonal prism 35 and a supporting member 36 for bearing the pentagonal prism 35. The viewfinder optical system is fixed to the top of the camera body 37 inside the camera 10C.

Moreover, the photographic optical system is composed of a lens frame, a photographic lens, and other component members stowed in the photographic lens barrel 4. Since the photographic optical system has no direct relationship to the present invention, illustration of the photographic optical system is therefore omitted.

The strobe lighting unit 8C is supported by a shaft member 42 fixed to a fixing member located on the top of the housing member 10*a*. The strobe lighting unit 8C is always constrained to pivot clockwise as shown in FIG. 18 around the shaft member 42, that is, to pop up by means of a constraining member (not shown).

The strobe lighting unit 8C is constructed as a typical unit composed of a xenon flash lamp, a reflector, a front dust-proof glass, and other members. Since the detailed structure of the strobe lighting unit 8C has no direct relationship to the present invention, description of the structure of the strobe lighting unit will therefore be omitted.

When stroboscopic photography is activated by manipulating the cover manipulation member 2C, the strobe lighting unit 8C pivots clockwise around the shaft member 42. The strobe lighting unit 8C then pops upward from the camera 10C, and thus is positioned in the popped-up state in which strobe lighting can be irradiated. In the popped-up state, the auxiliary strobe light irradiating side of the strobe lighting unit 8C is opposed to an object positioned ahead of the camera 10C (the state indicated with the alternating long and two short dashed line in FIG. 18).

Moreover, when the strobe lighting unit 8C is pivoted counterclockwise around the shaft member 42 as a center, the strobe lighting unit 8C is stowed in a space 4*a* of the housing member 10*a* located above the outer circumference of the photographic lens barrel 4. In this stowed state, the strobe lighting unit 8C is stowed in the space 4*a* with the auxiliary strobe light irradiating side thereof opposed to the outer circumference of the photographic lens barrel 4. In this position, a hook-like locking portion 43 of a supporting arm of the strobe lighting unit 8C is locked by a hook-like locking portion 44 of a locking slider 45 that is part of the strobe pop-up mechanism. The locking portion 44 has substantially the same shape as the locking portion 43.

In other words, the locking slider 45 can slide freely along the optical axis of the photographic lens and above the photographic lens barrel 4 inside the camera 10C. The slider 45 is constrained to move forward in the camera 10C by means of a constraining spring 46 such as a stretchable coil spring having one end thereof fixed to a locking portion of the photographic lens barrel 4. When the strobe lighting unit 8C is stowed, the locking portion 43 of the strobe lighting unit 8C is locked by the locking portion 44 of the locking slider 45. The strobe lighting unit 8C therefore remains stowed against a constraining force. The constraining force is exerted by the constraining member (not shown) for causing the strobe lighting unit 8C to pop up.

The strobe pop-up mechanism is, as shown in FIG. 18 to FIG. 22, composed of, the locking slider 45 the constraining spring 46, and other members such as a towline 47, a roller 48, a pulley 49, a pulley 50, a take-up spool 51, a supporting shaft 52, a supporting plate 53, and a pressing bar 55.

One end of the towline 47 is fixed to the locking slider 45. The towline 47 as shown in FIG. 18, extends from the locking slider 45 to the back of the camera 10C. Thereafter, the towline 47 is, as shown in FIG. 19, stretched on the outer circumference of the cylindrical roller 48. The cylindrical roller 48 is supported by a locking member located in the camera 10C in such a manner that the cylindrical roller 48 can rotate freely. Thus, the towline 47 is angled by 90° to thereby extend in a direction in which the towline is parallel to a plane orthogonal to the optical axis of the photographic lens.

Furthermore, the towline 47 is angled by 90° by means of the two pulleys 49 and 50 that are supported by the locking member in the camera 10C. The towline 47 is thus routed while avoiding interference with the photographic lens barrel 4. The other end of the towline 47 is joined to the outer circumference of the take-up spool 51 located on the bottom of the lens barrel 4. The towline 47 is formed from, for example, a flexible cord-like member. Specifically, a fibrous string, a metallic thin wire, or a rubber belt may be used to make the towline 47.

Incidentally, the roller 48, pulley 49, and pulley 50 for angling the towline 47 are supported by the locking member in the camera 10C so as to be able to turn freely. Alternatively, projections may be formed on the inner wall of the camera 10 so that the towline 47 can be tensioned.

The take-up spool 51 is, as shown in FIG. 19 and FIG. 20, clamped by the supporting plate 53 having a U-shaped section and supported by the supporting shaft 52 so that the take-up spool 51 can turn freely. An arm 51a projects outward from a predetermined position on the outer circumference of the take-up spool 51. The supporting plate 53 is fixed to the inner wall of the housing member la of the camera 10 by a coupling means, for example, screws. In this manner, the take-up spool 51 is supported by the supporting plate 53 via the supporting axis 52.

As mentioned above, the other end of the towline 47 is fixed to the take-up spool 51. When the take-up spool 51 rotates, the towline 47 is wound about the outer circumference of the take-up spool 51. The locking slider 45 is constrained toward the extended position by means of the constraining spring 46. The take-up spool 51 is therefore constrained to rotate clockwise as viewed in FIG. 20 around the supporting shaft 52 at the center of rotation as a result of the force exerted through of rotation the towline 47.

On the other hand, a through-hole 10b is bored in the wall surface on the bottom of the camera 10C. The pressing bar 55 is fitted into the through hole 10b so that the pressing bar 55 can slide freely along the optical axis of the photographic lens. The pressing bar 55 is always constrained to move toward the face of the camera 10C by means of a taut constraining spring 63. The constraining spring 63 is tensely stretched between the pressing bar 55 and the inner wall of the camera 10C.

The cover manipulation member 2C having the capability of a main power switch is manipulated to slide along the optical axis of the photographic lens towards the back of the camera 10C. Upon manipulation of the cover manipulation member 2C, a projection 2j presses the pressing bar 55 and thus causes the pressing bar 55 to slide towards the back of the camera 10C against the constraining force of the constraining spring 63. The projection 2j is formed on the back of the manipulation member 2C so that it will face backward or will be opposed to the through-hole 10b. The pressing bar 55 presses the arm 51a of the take-up spool 51. This causes the take-up spool 51 to pivot counterclockwise around the supporting shaft 52 as viewed in FIG. 20.

At the same time, the pressing bar 55 presses contracts 59, which constitute a main power switch, fixed to the inner wall of the housing member 10a. This brings the contracts into contact with each other. Consequently, the power switch is turned on, and the camera 10C is set to the photographic state.

The operation of a strobe pop-up mechanism in the camera having the foregoing structure will be described below.

FIG. 20, FIG. 21, and FIG. 22 show the states of the strobe pop-up mechanism resulting from manipulations of the cover manipulation member 2C of the camera. FIG. 20 shows the strobe pop-up mechanism in a state in which the lens protecting cover 1 is located at the open position and the main power switch is turned off. FIG. 21 shows the strobe pop-up mechanism in a state in which the lens protecting cover 1 is located at the open position and the main power switch is turned on. FIG. 22 shows the strobe pop-up mechanism in a state in which the lens protecting cover 1 is located at the open position, the main power switch is turned on, and the strobe lighting unit 8C is popped up.

Initially the lens protecting cover 1 is located at the closed position as shown in FIG. 18. The cover manipulation member 2C is slid towards the back of the camera 10C. This causes the lens protecting cover 1 to move to the open position. The state shown in FIG. 20 is then established. In this state, the chips 59 of the main power switch are not in contact with each other. The main power switch is therefore off. Moreover, the projection 2j of the cover manipulation member 2C is not abutting on the pressing bar 55.

From the state shown in FIG. 20, the cover manipulation member 2C is slid further towards the back of the camera. The manipulating member 2C reaches a predetermined click stop position. The state shown in FIG. 21 is then established. The index 2f described in relation to the first embodiment is aligned with the indicator 2h.

In this state, the projection 2j of the cover manipulation member 2C presses the pressing bar 55 by a predetermined magnitude. This brings the chips 59 of the main power switch into contact with each other. The power switch is turned on. Here, the tip of the pressing bar 55 is neither pressing nor turning the arm 51a of the take-up spool 51, although the tip thereof is abutting the arm 51a. Alternatively, the tip of the pressing bar 55 may be designed to not quite abutting the arm 51a in this position. Consequently, the strobe lighting unit 8C is not affected, and the camera 10C is set to the photographic state (on state).

From the state shown in FIG. 21, the cover manipulation member 2C is slid further towards the back of the camera. This causes the strobe lighting unit 8C to pop up. The state shown in FIG. 22 is then established. In other words, the main power switch is retained on, and the tip of the pressing bar 55 is pressing the arm 51a of the take-up spool 51. This causes the take-up spool 51 to rotate counterclockwise as viewed in FIG. 22. Consequently, the towline 47 is wound about the outer circumference of the take-up spool 51.

As a result, the locking slider 45 to which one end of the towline 47 is fixed slides towards the back of the camera 10C against the constraining force of the constraining spring 46 (see FIG. 18). The locking portion 43 of the strobe lighting unit 8C is unlocked from the locking portion 44 of the locking slider 45. The strobe lighting unit 8C therefore pivots clockwise in FIG. 18 around the shaft member 42 due to the constraining force of the constraining member (not shown). The strobe lighting unit 8C then pops up (the state indicated with the alternating long and two short dashed line in FIG. 18).

In this state, the back end of the cover manipulation member 2C abuts the housing member 10a as shown in FIG. 22, so that the manipulation member 2C is restrained from sliding further towards the back of the camera. The index 2f is then aligned with the indicator 2i indicating a strobe lighting-enabled position (see FIG. 3).

Once the strobe lighting unit 8C is popped up, the force exerted against the cover manipulation member 2C to slide the same is released. The cover manipulation member 2C is then pressed by the pressing bar 55 and slid forward. This is because the pressing bar 55 is reset to the predetermined position due to a recovering force exerted by the constraining spring 46. The state shown in FIG. 21 is established again. At the same time, the locking slider 45 slides forward due to the recovering force of the constraining spring 46. The take-up spool 51 is turned clockwise in FIG. 22 by way of the towline 47, and reset to the predetermined position. At this time, the strobe lighting unit 8C remains popped up.

From the state shown in FIG. 21, the cover manipulation member 2C is slid forward. This brings about the state shown in FIG. 20. Specifically, the pressing bar 55 is reset to the predetermined position due to the constraining force of the constraining spring 63. The main power switch is turned off.

When the cover manipulation member 2C is slid further forward, the lens protecting cover 1 is closed, and the index 2f is aligned with the indicator 2g indicating that the camera is off (see FIG. 1).

Even in this state, the strobe lighting unit 8C remains popped up. To move the strobe lighting unit 8C to the stowed position, an operator must press the strobe lighting unit 8C in the direction of arrow F. The locking portion 43 of the lighting unit 8C is thus locked by the locking portion 44 of the locking slider 45.

As mentioned above, according to the seventh embodiment, like the aforesaid embodiments, the lens protecting cover 1 can be opened or closed in response to a manipulation of the cover manipulation member 2C. Moreover, the main power switch can be turned on or off responsively thereto. When the cover manipulation member 2C is slid further, the strobe lighting unit 8C can be popped up using a simple mechanism without the necessity for a driving force exerted by a motor and an associated power consumption. This leads to an increase in freedom in designing the camera 10C to position the strobe pop-up mechanism in the camera 10C, thus contributing to a compact camera design.

In the strobe pop-up mechanism in the seventh embodiment, the cover manipulation member 2C located on the bottom of the camera 10C is interlocked with the strobe lighting unit 8C located on the top of the camera 10C by utilizing the towline 47. The strobe pop-up mechanism is provided to cause the strobe lighting unit 8C to pop up reliably. To perform this function, a movement made by the cover manipulation member 2C must be conveyed reliably to the locking slider 45 and the towline 47 must be tensioned properly.

However, when the path which conveys the movement made by the cover manipulation member 2C becomes long as it is in the seventh embodiment, the conveyance of the movement becomes unreliable. This is attributable to errors occurring during the course of manufacturing or assembling the component members of the strobe pop-up mechanism.

A means must be devised that can absorb such errors occurring during the course of manufacturing or assembling the members of the strobe pop-up mechanism, and that can ensure a reliable movement for popping up the strobe lighting unit.

Figure 23:
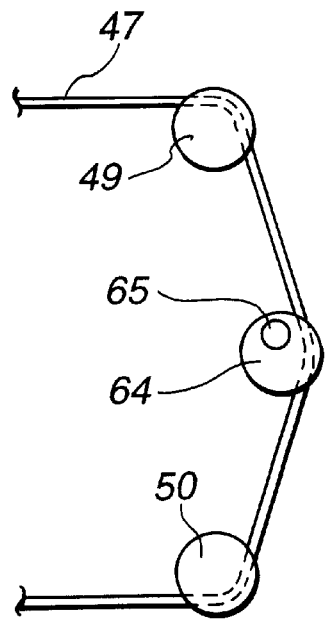
FIG. 23 is a diagram of a relevant portion of an eighth embodiment of the present invention, showing an adjustment mechanism for adjusting a towline included in a strobe pop-up mechanism.

FIG. 23 is a diagram relating to an eighth embodiment of the present invention and showing a relevant portion of a mechanism for adjusting the towline included in the strobe pop-up mechanism. This embodiment provides the adjustment mechanism as an addition to the camera of the seventh embodiment. The description of the other components will therefore be omitted. For the component members other than the adjustment mechanism, the seventh embodiment will be referenced (FIG. 18 to FIG. 22). The same reference numerals as those employed in the seventh embodiment will therefore be employed in the description below.

The adjustment mechanism for the strobe pop-up mechanism in accordance with the eighth embodiment is constructed with an eccentric pulley 64 serving as a route adjusting means and being interposed between the pulleys 49 and 50. The pulleys 49 and 50 are included for efficiently routing the towline 47 that interlocks the cover manipulation member 2C with the strobe lighting unit 8C.

The eccentric pulley 64 is supported by a locking member in the camera 10C to which an eccentric center of rotation 65 thereof is fixed using a fastening means such as a screw. Any slack in the towline 47 between the pulley 49 and pulley 50 is adjusted by means of the eccentric pulley 64.

Specifically, the adjustment mechanism in this embodiment is devised in consideration of the towline 47 being made from a flexible cord-like member, such as a string or strap made of a resin or fibers, a metallic thin wire, or a rubber belt. The eccentric pulley 64 is used to stretch or contract the towline 47, thus adjusting the slack in the towline.

To adjust the towline 47 using the adjustment mechanism, the members constituting a strobe pop-up mechanism are first assembled. Thereafter, the center of rotation of the eccentric pulley 64 is adjusted so that the strobe lighting unit 8C will pop up reliably response to a manipulation of the cover manipulation member 2C. Thus, the route of the towline 47 is finely adjusted, and the path from the locking slider 45 to the take-up spool 51 is optimized. An optimal state of the towline 47 is a state in which the towline 47 is tensioned properly.

According to the eighth embodiment having the foregoing structure, the eccentric pulley 64 is merely positioned along the route of the towline 47. Nevertheless, a deviation in the length of the towline 47 extending from the locking slider 45 to the take-up spool 51, or an error occurring during the course of manufacturing or assembling the component members can be absorbed to optimize the route of the towline 47. It is thus easy to increase the reliability of the strobe pop-up mechanism.

Figure 24:
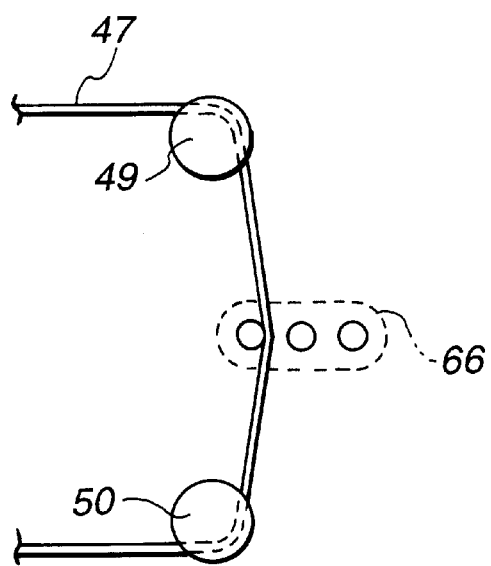
FIG. 24 is a diagram of a relevant portion of a ninth embodiment of the present invention, showing an adjustment mechanism for adjusting a towline included in a strobe pop-up mechanism.

Moreover, a means described below is conceivable as an adjustment mechanism in another embodiment. FIG. 24 is a diagram relating to a ninth embodiment of the present invention and showing a relevant portion of an adjustment mechanism for adjusting a towline included in a strobe pop-up mechanism. In this embodiment, the adjustment mechanism is provided as an addition to the camera of the seventh embodiment. A description of this embodiment will therefore be made with reference to the components of the seventh embodiment.

The adjustment mechanism employed in this embodiment has a plurality of projections 66 formed on a locking member in the camera 10C and substituted for the eccentric pulley 64 provided in the eighth embodiment. The plurality of rod-like projections 66 are juxtaposed equidistantly along a straight line in a direction in which they are orthogonal to the towline 47 tensioned between the pulleys 49 and 50. The projections 66 may be formed by uniting rod-line projections with the locking member in the camera 10C, or implanting them in the locking member.

After the members constituting the strobe pop-up mechanism are assembled, an optimal one of the plurality of projections 66 is selected. The optimal one is a projection enabling the strobe lighting unit 8C to reliably pop up in response to manipulation of the cover manipulation member 2C to turn on the main power switch. The towline 47 is then passed along the selected projection. Thus, the route of the towline 47 is finely adjusted, and the path from the locking slider 45 to the take-up spool 51 is optimized.

The ninth embodiment having the foregoing structure can provide the same advantages as the eighth embodiment. Alternatively, pulleys having the plurality of projections 66 as the centers of rotation thereof may be juxtaposed equidistantly. In this embodiment, the projections 66 are arranged outside the route of the towline 47. Alternatively, the projections 66 may be juxtaposed along a straight line inside the route of the towline 47.

Figure 25:
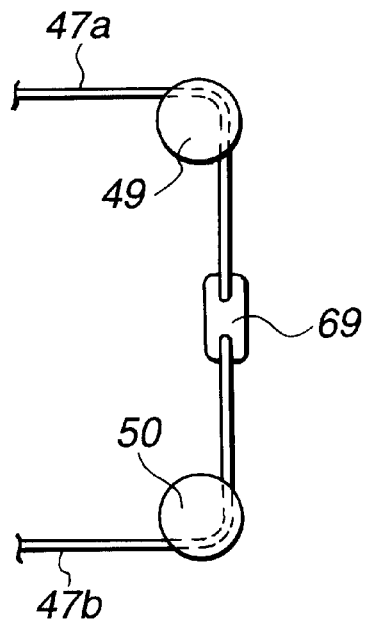
FIG. 25 is a diagram of a relevant portion of a tenth embodiment of the present invention, showing an adjustment mechanism for adjusting a towline included in a strobe pop-up mechanism.

FIG. 25 is a diagram relating to a tenth embodiment of the present invention and showing a relevant portion of another adjustment mechanism for adjusting the towline included in the strobe pop-up mechanism. The camera of this embodiment fundamentally has substantially the same components as the camera of the seventh embodiment. The coupling member and the components of the adjustment mechanism are provided as an addition to the camera of the seventh embodiment. Only these differences will be described below.

An interlocking member couples the locking slider 45 included in the strobe pop-up mechanism of this embodiment to the take-up spool 51. The interlocking member joins two towlines 47a and 47b, that is, a towline 47a extending from the locking slider 45 is connected to a towline 47b extending from the take-up spool 51 via a coupling adjustment member 69. Specifically the coupling adjustment member 69 is a coupling member for coupling the two towlines 47a and 47b. The coupling adjustment member 69 also has the capability to adjust the lengths of the towlines 47a and 47b so that the towlines will be properly tensioned in a normal state of the strobe pop-up mechanism.

In other words, according to this embodiment, when the set of members are assembled, at least one of the towlines 47a and 47b remains unaffixed to the coupling adjustment member 69. Thereafter, the towlines 47a and 47b are adjusted so that the lengths thereof from the locking slider 45 to the take-up spool 51 will become optimal, and they will be properly tensioned in a normal state. The adjustment is intended to enable the strobe lighting unit 8C to pop up accurately in response to manipulation of the cover manipulation member 2C to turn on the main power switch. In this manner the towlines 47a and 47b are coupled to each other.

The tenth embodiment having the foregoing components can provide the same advantages as the eighth embodiment.

Figure 26:
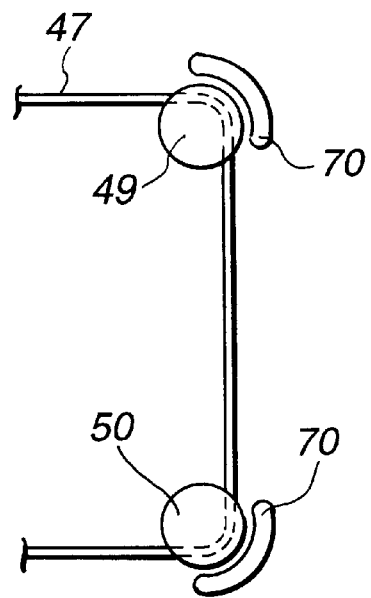
FIG. 26 is a diagram of a relevant portion of an eleventh embodiment of the present invention, showing an adjustment mechanism for adjusting a towline included in a strobe pop-up mechanism.

FIG. 26 is a diagram relating to an eleventh embodiment of the present invention and showing a relevant portion of another adjustment mechanism for adjusting the towline included in the strobe pop-up mechanism. The camera of this embodiment has fundamentally substantially the same components as the camera of the seventh embodiment. The components of the adjustment mechanism are provided as an addition to the camera of the seventh embodiment. Only the components which are different will be described below.

The adjustment mechanism employed in this embodiment is constructed by forming arc-shaped projections 70 as integral parts of a locking member or separately from the locking member in the camera 10C. The arc-shaped projections 70 are formed along the outer circumferences of the pulleys 49 and 50 near the pulleys 49 and 50 so as to help route the towline 47. A spacing large enough for the towline 47 to move is maintained between the projections 70 and the pulleys 49 and 50. A path along which the towline 47 moves is thus maintained.

The towline 47 may slacken because of a deviation of the length of the towline 47 or an error occurring during the course of manufacturing or assembling the component members. Nevertheless, due to the foregoing structure, the route of the towline 47 is ensured by the projections 70 so that the position of the towline 47 is restricted accordingly.

Consequently, occurrence of an incident in which the towline 47 becomes disengaged from the pulleys 49 and 50 can be reduced. A movement made by the cover manipulation member 2C can thus be accurately conveyed to the strobe pop-up mechanism. In this manner, popping up the strobe lighting unit 8C can be reliably performed.

The eighth through eleventh embodiments have been described with respect to the aspect of the adjustment mechanism for absorbing the slack in the towline included in the strobe pop-up mechanism. The towline used as a coupling member may be shortened as shown in FIG. 27.

Figure 27:
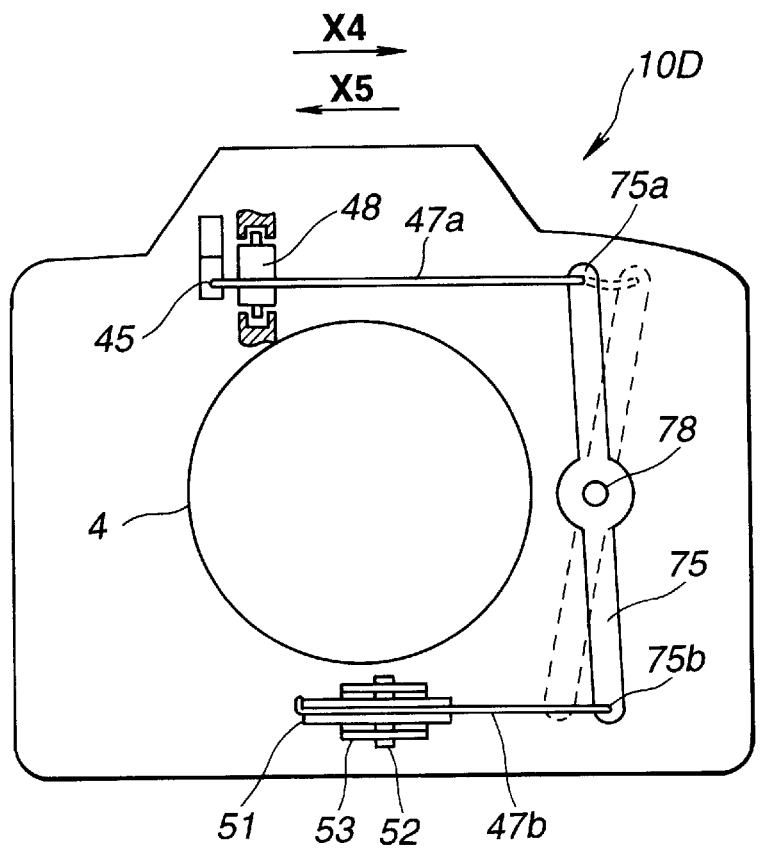
FIG. 27 is a schematic diagram of the structure of a strobe pop-up mechanism in a camera in accordance with a twelfth embodiment of the present invention.

FIG. 27 is a diagram schematically showing the structure of a strobe pop-up mechanism in a camera of a twelfth embodiment of the present invention. The camera of this embodiment has fundamentally substantially the same components as the camera of the seventh embodiment. A difference lies in the components of the coupling member. The same reference numerals will be assigned to the same component members. The description of those component members will therefore be omitted, and only the components which are different will be described below.

An interlocking member couples the locking slider 45 included in the strobe pop-up mechanism of this embodiment to the take-up spool 51. The interlocking member is formed by coupling two towlines, that is, the towline 47a extending from the locking slider 45 and the towline 47b extending from the take-up spool 51 via a swivel coupling member 75.

The swivel coupling member 75 is supported by a locking member (not shown) in the camera 10D via a supporting shaft 78 so that the swivel coupling member 75 can swivel freely. One end of the towline 47a is coupled to the tip of one arm 75a. One end of the towline 47b is coupled to the tip of the other arm 75b. The two short towlines 47a and 47b are coupled to each other with the swivel coupling member 75 between them. This leads to a reduction in the occurrence of errors resulting from a deviation in the length of the towline itself.

In this embodiment, when the cover manipulation member 2C is manipulated to turn on the main power switch, the take-up spool 51 is turned in a predetermined direction as described above in relation to the seventh embodiment (see FIG. 18). The towline 47b is then wound around the take-up spool 51. This causes the swivel coupling member 75 to swivel clockwise as viewed in FIG. 27 with the supporting shaft 78 at the center due to tension in the towline 47b. The swivel coupling member 75 thus becomes positioned as indicated with a dashed line in FIG. 27.

The towline 47a is pulled in the direction of arrow X5 in FIG. 27 due to a constraining force exerted by the constraining spring 46 for constraining the locking slider 45. When the swivel coupling member 75 swivels clockwise in FIG. 27, the towline 47a is pulled in the direction of arrow X4 in FIG. 27. This causes the locking slider 45 to slide in the same direction X4 against the constraining force of the constraining spring 46. The strobe lighting unit 8 is then popped up.

Due to the foregoing structure, according to the twelfth embodiment, any slack in the towline itself can be reduced by using a plurality of short towlines.

Moreover, the strobe pop-up mechanism is constructed without the use of the pulley for angling the route of a towline. A movement made by the cover manipulation member 2C can be conveyed efficiently without any influence such as a rotational resistance induced between the towline and pulley when the pulley is used. Popping up of the strobe light unit can thus be carried out reliably.

In each of the foregoing embodiments, the locking slider 45 may be designed to partially project out from the housing member of the camera. A mechanism may be added to enable a user of the camera to slide the locking slider 45 directly and manually. As such, a plurality of arrangements is available for popping up the strobe lighting unit: a mechanism which is activated upon manipulating the cover manipulation member and a mechanism for manually sliding the jutting portion of the locking slider. A user can select either of these arrangements. This flexibility contributes to an improvement in the maneuverability of the camera.

In the seventh to twelfth embodiments, the towline 47 is used as an interlocking member in the strobe pop-up mechanism. The strobe lighting unit can be mechanically popped up in response to a manipulation of the cover manipulation member without the use of power exerted by a motor or the like. A portion of the interlocking member is therefore exposed to the outside the camera. The exposure of this portion may result in invasion of moisture or the like through this portion during the use of the camera.

Figure 28:
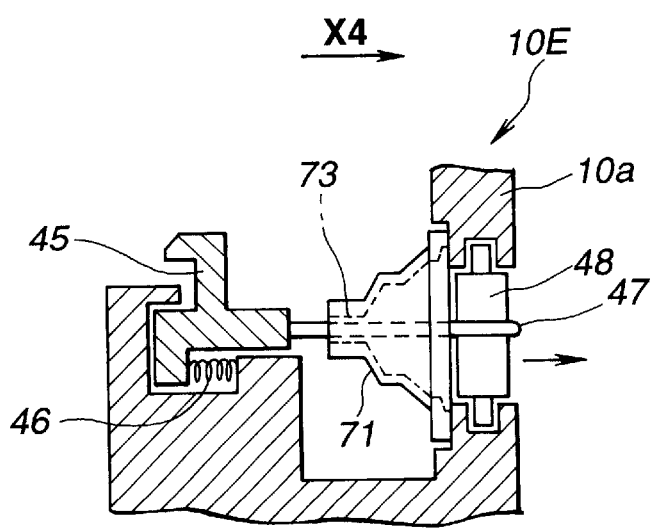
FIG. 28 is an enlarged longitudinal sectional view of a relevant portion (locking slider and its surroundings) of a camera in accordance with a thirteenth embodiment of the present invention.

A camera of a thirteenth embodiment of the present invention has a waterproof function (drip-proof means) provided for a portion of the towline 47 serving as an interlocking member which is exposed to the outside the camera. FIG. 28 is a longitudinal sectional view showing in enlargement a relevant portion of the camera of this embodiment (a locking slider and its surroundings). The camera of this embodiment has the same components as the camera of the seventh embodiment. The same reference numerals will therefore be assigned to the same component members. The description of those component members will thus be omitted. Only the different components of this embodiment will be described below.

As shown in FIG. 28, a camera 10E of this embodiment has a rubber member 71 placed near the locking slider 45 and under an edge of the housing member 10a. The rubber member 71 serves as a drip-proof means and has a substantially conical shape. The rubber member 71 is affixed to the outer wall of the housing member 10a of the camera 10E in a watertight fashion with a conical apex thereof facing toward the locking slider 45 and in a direction in which the locking slider 45 slides. A through-hole 73 is bored substantially in the center of the rubber member 71. The towline 47 is inserted into the through-hole 73 and affixed to the inner wall of the through-hole 73 in a watertight fashion.

In the camera 10E having the foregoing structure, the cover manipulation member 2C is manipulated to slide. This causes, as described in relation to the seventh embodiment, the strobe pop-up mechanism to operate. The towline 47 is pulled in the direction of arrow X4 as shown in FIG. 28. The locking slider 45 slides in the same direction against a constraining force exerted by the constraining spring 46. This causes the strobe lighting unit 8 (not shown in FIG. 28) (see FIG. 18) to pop up. Meanwhile, the towline 47 is affixed in the through-hole 73 of the rubber member 71. As the towline 47 moves in the direction of arrow X4, the rubber member 71 deforms due to its own elasticity. The rubber member 71 is pulled in the same direction X4 toward the end fixed to the housing member 10a.

According to the thirteenth embodiment having the foregoing structure, the rubber member 71 capable of deforming freely is fixed in a watertight fashion to the portion of the towline 47 which is exposed to the outside the housing member 10a. The towline 47 is a component member of the strobe pop-up mechanism and serves as an interlocking member. Consequently, the camera 10E can easily be designed to have a waterproof structure.

Alternatively, a non-permeable filter or the like may be substituted for the rubber member 71 serving as a drip-proof means. The same advantages as those described above can still be provided.

Figure 29:
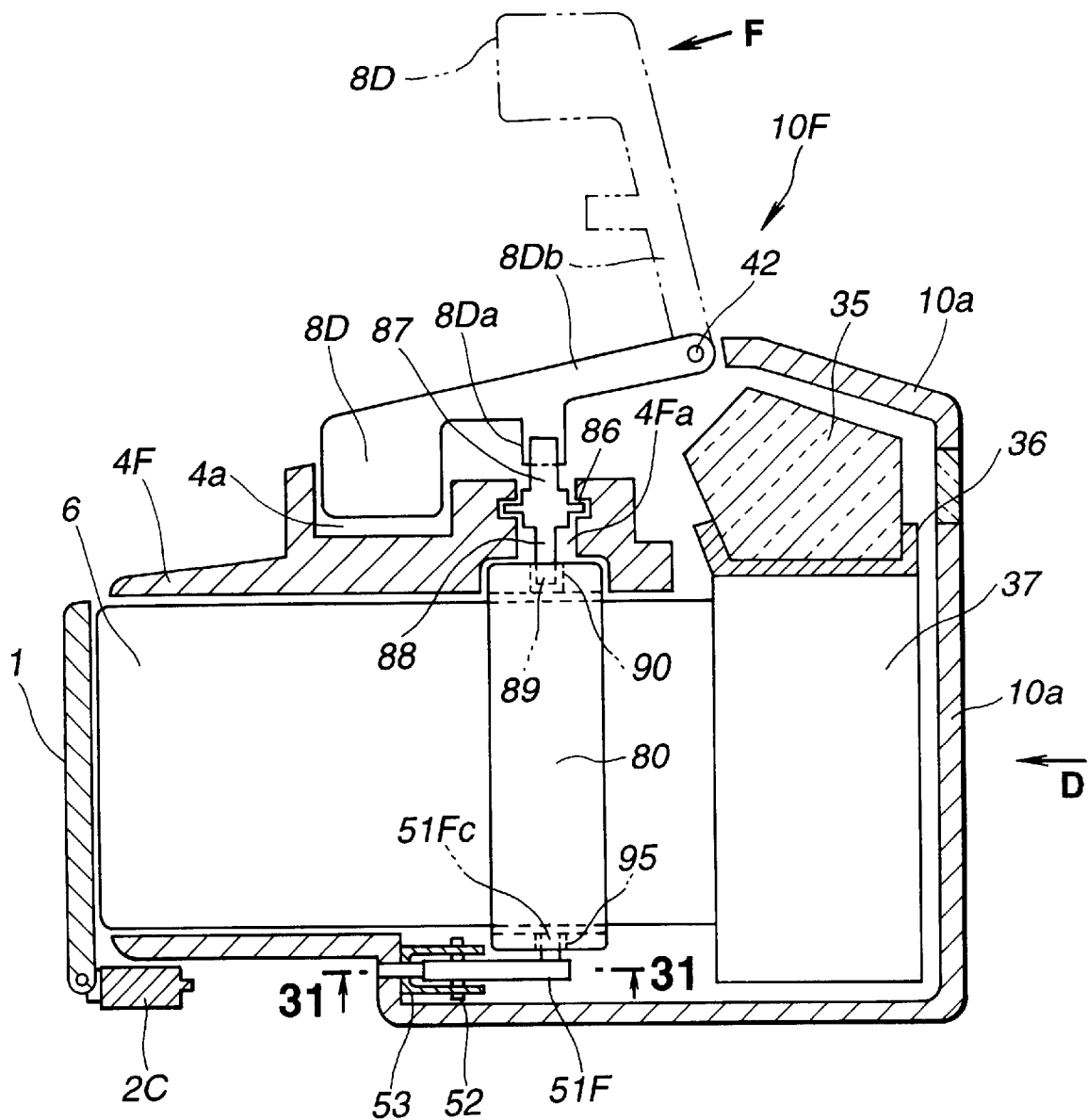
FIG. 29 is a longitudinal cross-sectional view of the center cutting plane of a lens protecting cover-attached camera in accordance with a fourteenth embodiment of the present invention.
Figure 30:
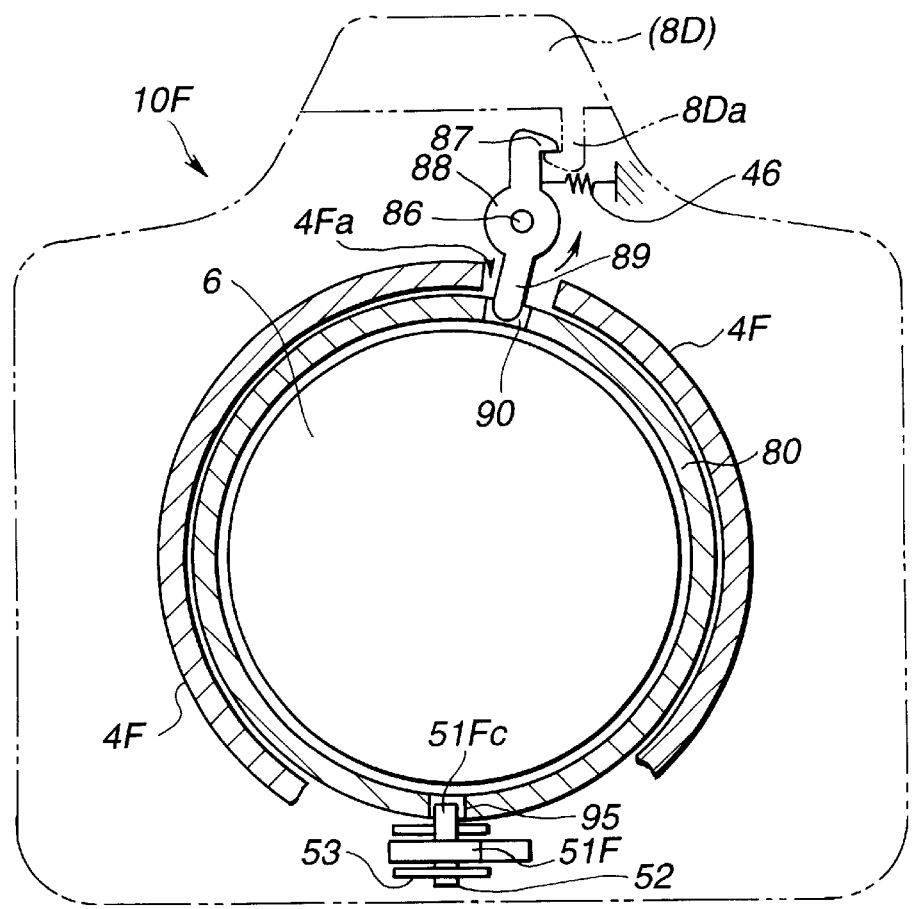
FIG. 30 is a schematic diagram showing the structure of a strobe pop-up mechanism seen from the back of the camera shown in FIG. 29.
Figure 31:
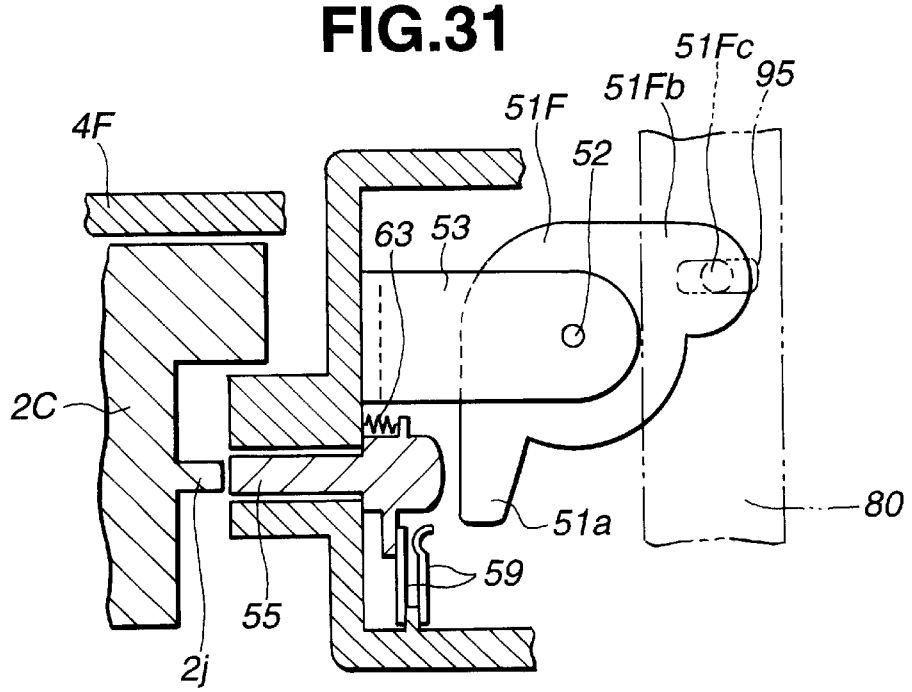
FIG. 31 is an enlarged cross-sectional view of the 31–31 cutting plane of a relevant portion of the camera shown in FIG. 29, showing a strobe pop-up mechanism in a state in which a lens protecting cover is located at an open position and a main power switch is turned off.
Figure 32:
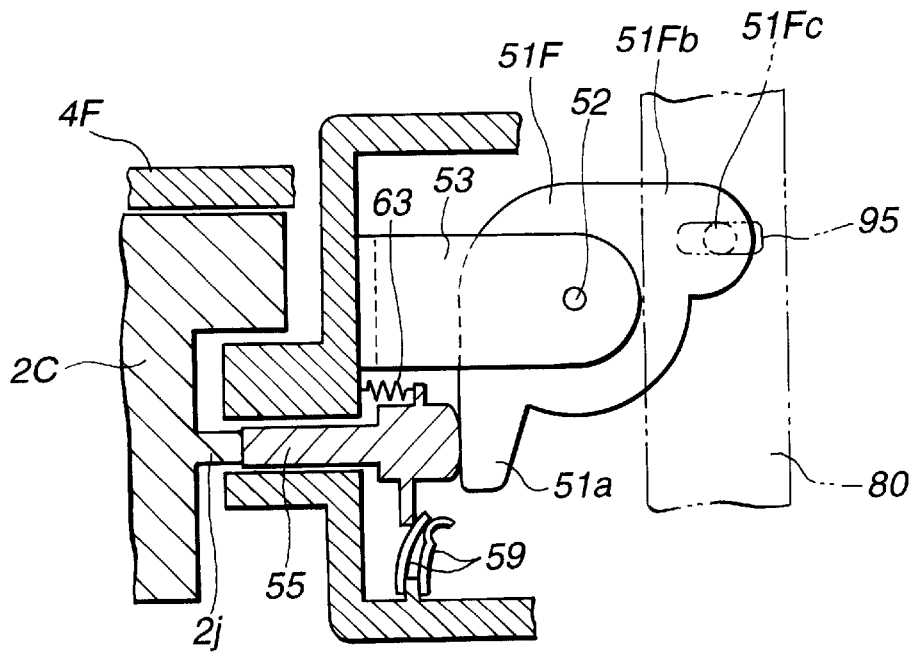
Figure 33:
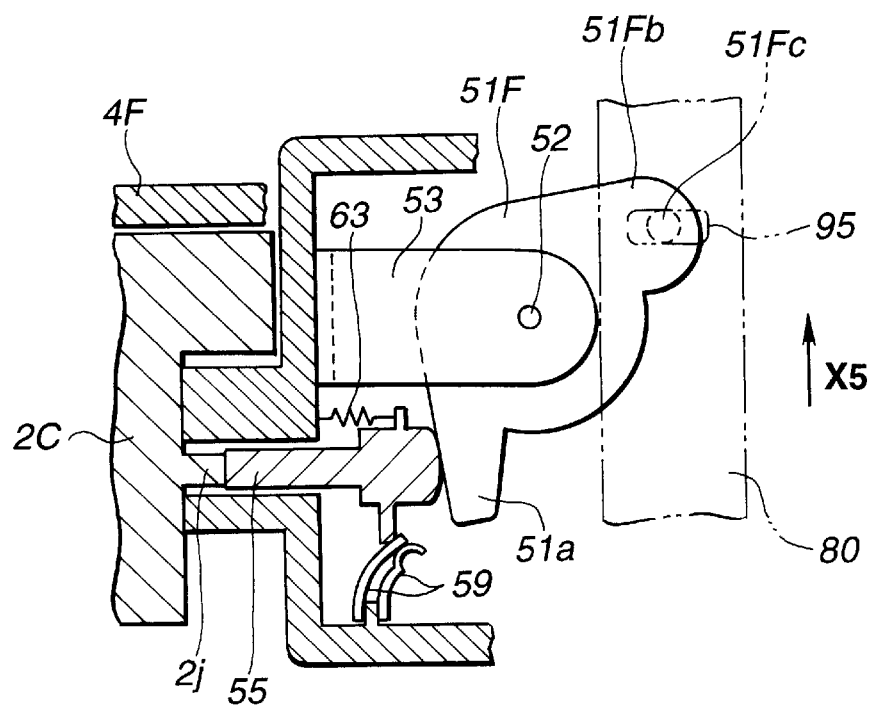
FIG. 33 is an enlarged cross-sectional view of the 31–31 cutting plane of the relevant portion of the camera shown in FIG. 29, showing the strobe pop-up mechanism in a state in which the lens protecting cover is located at the open position, the main power switch is turned on, and the strobe lighting unit is popped up.
Figure 34:
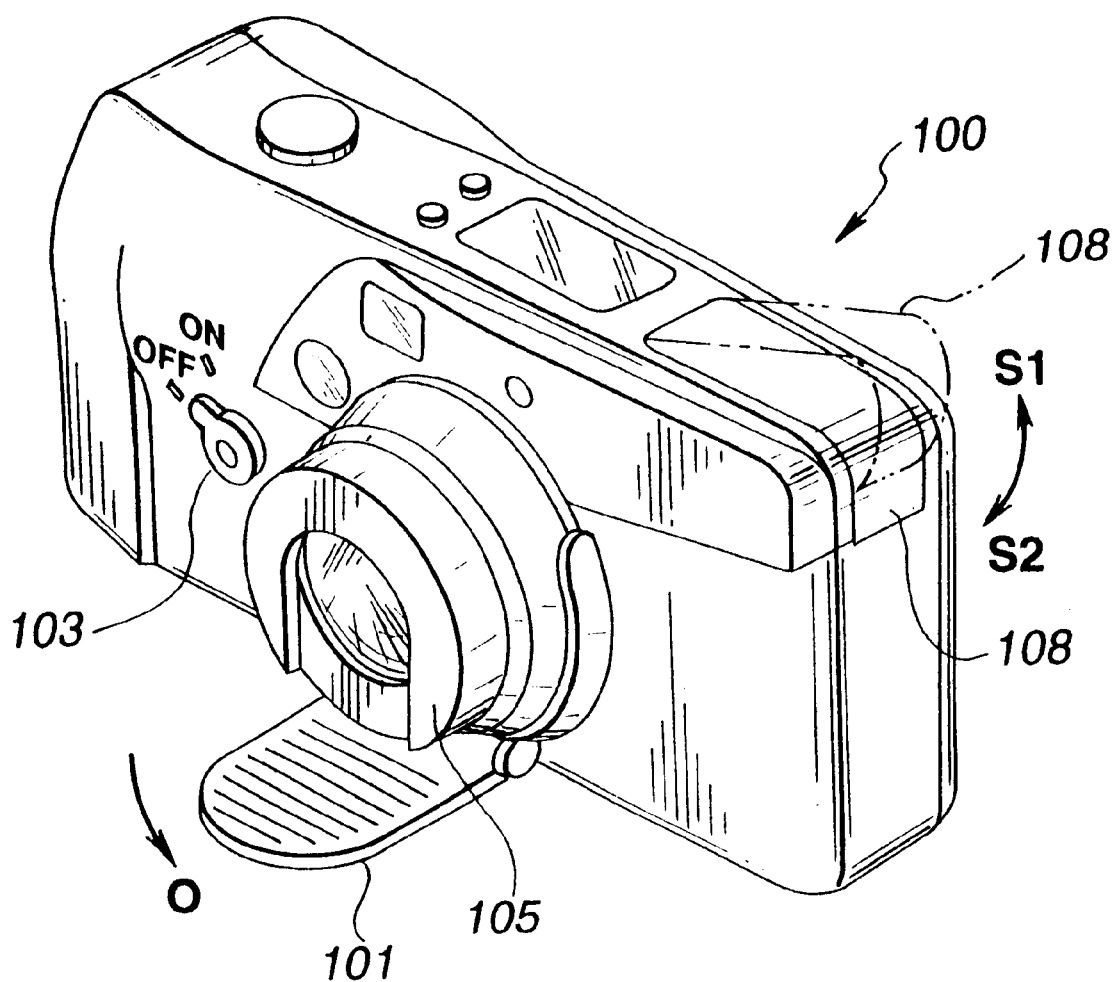
FIG. 34 is an oblique view schematically showing a lens protecting cover-attached camera the prior art.

FIG. 29, FIG. 30, FIG. 31, FIG. 32, and FIG. 33 are diagrams relating to a fourteenth embodiment of the present invention. FIG. 29 is a longitudinal cross-sectional view showing the center plane of a lens protecting cover-attached camera. FIG. 30 is a schematic view showing the structure of a strobe pop-up mechanism seen from the back of the camera (in the direction of arrow D in FIG. 29). FIG. 31, FIG. 32, and FIG. 33 are enlarged cross-sectional views of the 31—31 cutting plane of a relevant portion of the strobe pop-up mechanism shown in FIG. 29. Also in FIG. 31, FIG. 32, and FIG. 33 show the states of the strobe pop-up mechanism resulting from manipulations of a cover manipulation member of the camera. To prevent the drawings from becoming complicated, only the strobe pop-up mechanism is illustrated in detail in the same manner as that in the seventh embodiment (see FIG. 18 to FIG. 22). The other component members are therefore not illustrated.

The camera of this embodiment has fundamentally substantially the same components as the cameras of the seventh to eleventh embodiments. A mechanism included in the strobe pop-up mechanism instead of the towline will be described by taking an example. The towline serves as an interlocking means for conveying a movement made by a cover manipulation member to a locking slider. The same reference numerals will be assigned to the same members previously described. The details of those members will therefore be omitted, and only the different members alone will be described below.

In a camera 10F of this embodiment, a rotary ring 80 is, as shown in FIG. 29 and FIG. 30, engaged with the outer circumference of the lens holding frame 6 incorporated in the photographic lens barrel 4F. The rotary ring 80 serves as an interlocking member for conveying a movement made by the cover manipulation member 2C. The rotary ring 80 substantially replaces the towline 47 (see FIG. 18) provided in the seventh embodiment.

Moreover, a locking portion 8Da is formed at a predetermined position on a supporting arm 8Db of a strobe lighting unit 8D. The locking portion 8Da is engaged with a hook portion 87 of a locking member 88 that is disposed under the top of the camera 10F when the strobe lighting unit 8D is positioned in the stowed position.

The locking member 88 is supported by a locking member in the camera 10F via a supporting shaft 86 near the top of the camera 10F. The locking member 88 substantially replaces the locking slider 45 provided in the seventh embodiment (see FIG. 18). The hook portion 87 is formed as part of one arm of the locking member 88. The hook portion 87 is engaged with the locking portion 8Da when the strobe lighting unit 8D is stowed as shown in FIG. 29 and FIG. 30. The locking member 88 is constrained to move clockwise as viewed in FIG. 30 by means of the constraining spring 46. The strobe lighting unit 8D is constrained to pivot clockwise in FIG. 30 around the shaft member 42.

The other arm 89 of the locking member is fitted in a through-hole 90 and through a through-hole 4Fa in a photographic lens barrel 4F. The through-hole 90 is bored at a predetermined position on the top of the rotary ring 80. The locking member 88 is caused a turn when the rotary ring 80 is turned. The through-hole 4Fa is wide enough to permit the rotary ring 80 and locking member 88 to turn within a predetermined rotational range.

On the other hand, the supporting plate 53 is fixed to the inner wall of the housing member 10a of the camera 10F under the bottom of the photographic lens barrel 4F by means of, for example, a screw or any other coupling means (not shown). The supporting plate 53 has a substantially U-shaped section. A take-up spool 51F is clamped by the supporting plate 53, and is supported by the supporting shaft 52 so that it can rotate freely.

Two arms 51a and 51Fb are, as shown in FIG. 31, formed on the outer circumference of the take-up spool 51F in such a manner so as to extend outward. An engagement pin 51Fc is implanted in one arm 51Fb so that it will face upward. The engagement pin 51Fc is engaged with an elongated hole 95 bored in the lower part of the rotary ring 80. The other components are identical to those of the seventh embodiment.

The operation of the strobe pop-up mechanism in the camera having the foregoing structure will be described below.

FIG. 31, FIG. 32, and FIG. 33 show the states of the strobe pop-up mechanism resulting from manipulations of the cover manipulation member 2C of the cameras FIG. 31 shows the strobe pop-up mechanism in a state in which the lens protecting cover 1 is located at the open position and the main power switch is turned off. FIG. 32 shows the strobe pop-up mechanism in a state in which the lens protecting cover 1 is located at the open position and the main power switch is turned on. FIG. 33 shows the strobe pop-up mechanism in a state in which the lens protecting cover 1 is located at the open position, the main power switch is turned on, and the strobe lighting unit 8D is popped up.

Initially the lens protecting cover 1 is located at the closed position in the state shown in FIG. 29. The cover manipulation member 2C is slid towards the back of the camera 10F. This causes the lens protecting cover 1 to move to the open position. The state shown in FIG. 31 is then established. In this state, the chips 59 of the main power switch are not in contact with each other. The main power switch is therefore off. Moreover, the projection 2j of the cover manipulation member 2C is not abutting on the pressing bar 55.

From the state shown in FIG. 31, the cover manipulation member 2C is slid further towards the back of the camera. The cover manipulation member 2C is than positioned as shown in FIG. 32. At this position, the index 2f described in relation to the first embodiment is aligned with the indicator 2h.

In this state, the projection 2j of the cover manipulation member 2C presses the pressing bar 55 by a predetermined magnitude. This brings the chips 59 of the main power switch into contact with each other. The power switch is therefore turned on.

On the other hand, the tip of the pressing bar 55 abuts the arm 51a of the take-up spool 51F and presses the arm 51a. Nevertheless, the take-up spool 51 has not been rotated because the tip of the pressing bar 55 has pressed so hard as to rotate the arm 51a. In this state, the strobe lighting unit 8D remains unaffected. Meanwhile, the camera 10F is set to the photographic state (turned on).

From the state shown in FIG. 32, the cover manipulation member 2C is slid further towards the back of the camera. This causes the strobe lighting unit 8D to pop up. The state shown in FIG. 33 is then established. Specifically, the tip of the pressing bar 55 presses the arm 51a of the take-up spool 51F while the main power switch is held in the on state. The take-up spool 51F then turns counterclockwise is viewed in FIG. 33. This causes the engagement pin 51Fc to move along the elongated hole 95 and turn the rotary ring 80 in the direction of arrow X5 in FIG. 33. Specifically, the rotary ring 80 turns clockwise as viewed in FIG. 30 (when seen from the back of the camera 10F). The other arm 89 of the locking member 88 fitted in the through-hole 90 of the rotary ring 80 is pressed. This causes the locking member 88 to turn counterclockwise as viewed in FIG. 30 around the supporting shaft 86 at the center. Consequently, the locking portion 8Da of the strobe lighting unit 8D is disengaged from the hook portion 87 of the locking member 88. The strobe lighting unit 8D pivots clockwise as viewed in FIG. 29 around the shaft member 42 due to the constraining force exerted by the constraining member (not shown). The strobe lighting unit 8D is then popped up (as indicated with a dashed line in FIG. 29).

In this state, the back end of the cover manipulation member 2C abuts the housing member 10a of the camera 10F as shown in FIG. 33. The cover manipulation member 2C is restrained from sliding any further towards the back of the camera. The index 2f is aligned with the indicator 2i indicating a strobe lighting-enabled position (see FIG. 3).

From the position shown in FIG. 33, the user's finger pressing in the cover manipulation member 2C or other means exerting pressure thereon is released. The cover manipulation member 2C is then pressed forward by the pressing bar 55 so as to be reset to the predetermined position due to a recovering force exerted by the constraining spring 63. The state shown in FIG. 32 is then resumed. At the same time, the locking member 88 turns clockwise due to a recovering force exerted by the constraining force 46. This causes the take-up spool 51F to turn clockwise as viewed in FIG. 33 by way of the rotary ring 80. The take-up spool S1F is then reset to the predetermined position. At this time, the strobe lighting unit 8D remains popped up.

From the state shown in FIG. 32, the cover manipulation member 2C is slid forward. The state shown in FIG. 31 is then established. Specifically, the pressing bar 55 is reset to the predetermined position due to the constraining force of the constraining spring 63. The main power switch is turned off.

When the cover manipulation member 2C is slid further forward, the lens protecting cover 1 is closed. The index 2f is aligned with the indicator 2g indicating that the camera is turned off (see FIG. 1).

Even in this state, the strobe lighting unit 8D remains popped up. To move the strobe lighting unit 8D to the stowed position, the same manipulation as that described in relation to the seventh embodiment is carried out. Specifically , the locking portion 8Da of the strobe lighting unit 8D is engaged with the hook portion 87 of the locking member 88.

As described above, the fourteenth embodiment can provide the same advantages as the seventh embodiment. Moreover, compared with a structure which incorporates a member that may slacken, such as a towline serving as an interlocking member and provided in the strobe pop-up mechanism, the structure of this embodiment can easily pop up the strobe lighting unit more reliably. This is because the occurrence of error made during the course of manufacturing or assembling the component members can be reduced.

Moreover, the interlocking member is positioned in the camera by effectively utilizing a space created between the photographic lens barrel 4F and lens holding frame 6. This contributes to compact designing of the camera 10F.

Furthermore, successive stepwise manipulations can be performed for turning on or off the main power switch, opening or closing the lens protecting cover, and popping up the strobe lighting unit located at the stowed position. The manipulations can be performed merely by manipulating a single member (cover manipulation member). This contributes to an improvement in the maneuverability of the camera.

Moreover, a movement can be made for popping up the strobe lighting unit 8D without the necessity of a driving force exerted by a motor or the like. This contributes to the saving of power consumed by the camera.

Moreover, the lens protecting cover 1 can be de signed to project out by a smaller magnitude when the camera is set to the photographic state. Breaking of the lens protecting cover 1 can therefore be prevented by mean s of a simpler mechanism.

According to the present invention, it is apparent that a wide range of different embodiments can be constructed based on the present disclosure without departing from the spirit and scope of the invention. This invention will be limited by the accompanying claims but not restricted by any specific embodiments discussed herein.

What is claimed is:

1. A lens protecting cover-attached camera, comprising:
   a photographic lens having an optical axis and a face;
   a lens protecting cover for protecting the face of said photographic lens;
   a supporting shaft oriented so as to be parallel to a plane substantially perpendicular to the optical axis of said photographic lens, for supporting said lens protecting cover; and
   a moving mechanism for moving said supporting shaft along a direction parallel to the optical axis of said photographic lens so that said lens protecting cover pivots around said supporting shaft from a closed position at which said cover shields the face of said photographic lens, to an open position at which the face of said photographic lens is exposed, and for turning on or off a power switch in response to a movement of said moving mechanism relative to said photographic lens along a direction parallel to the optical axis of said photographic lens.

2. A lens protecting cover-attached camera according to claim 1, further comprising a constraining member for biasing said lens protecting cover towards the closed position.

3. A lens protecting cover-attached camera according to claim 1, wherein said lens protecting cover is supported on said shaft such that when an extraneous force is applied to said lens protecting cover positioned at the open position, said lens protecting cover pivots around said supporting shaft.

4. A lens protecting cover-attached camera according to claim 1, wherein said lens protecting cover includes of a plurality of members mutually coupled so as to be able to turn freely with respect to each other.

5. A lens protecting cover-attached camera according to claim 4, wherein said supporting shaft is a first supporting shaft, and said lens protecting cover further includes a second supporting shaft oriented in parallel to said first supporting shaft, and said plurality of members are coupled in a manner such that when an extraneous force is applied to said lens protecting cover positioned at the open position, said plurality of members become pivotable and pivot relative to each other around said second supporting shaft.

6. A lens protecting cover-attached camera according to claim 1, further comprising a strobe lighting unit that pops up from a non-irradiating position at which strobe lighting is not enabled, to an irradiating position at which strobe lighting is enabled, in response to a movement of said lens protecting cover relative to said photographic lens and along a direction parallel to the optical axis of said photographic lens.

7. A lens protecting cover-attached camera, comprising:
   a lens barrel accommodating a photographic lens and having an optical axis and a face;
   a lens protecting cover for protecting the face of said photographic lens;
   a supporting shaft oriented in a direction parallel to a plane substantially perpendicular to the optical axis of said lens barrel for supporting said lens protecting cover;
   a moving mechanism for moving said supporting shaft along a direction parallel to the optical axis of said lens barrel so that said lens protecting cover pivots around said supporting shaft from a closed position at which said lens protecting cover shields the face of said photographic lens accommodated in said lens barrel, to an open position at which the face of said photographic lens is exposed, and for turning on or off a power switch in response to a movement of said moving mechanism along a direction parallel to the optical axis of said lens barrel; and
   a strobe lighting unit that pops up from a stowed position in a camera body to an irradiating position at which strobe lighting is enabled in response to a movement of said lens protecting cover relative to said lens barrel and along a direction parallel to the optical axis by said lens protecting cover.

8. A lens protecting cover-attached camera according to claim 7, further comprising a groove formed along a direction parallel to the optical axis of said lens barrel, wherein said moving mechanism slides along said groove.

9. A lens protecting cover-attached camera according to claim 7, further comprising a shaft extending along a direction parallel to the optical axis of said lens barrel, wherein said moving mechanism slides along said shaft.

10. A lens protecting cover-attached camera according to claim 7, wherein said lens protecting cover includes a plurality of members mutually coupled so as to be able to turn freely with respect to each other.

11. a lens protecting cover-attached camera according to claim 10, wherein said plurality of members constituting said lens protecting cover are mutually coupled by a click mechanism formed by a convex part and a corresponding and mating concave part of the members.

12. A lens protecting cover-attached camera according to claim 11, wherein said convex part is a blade spring.

13. A lens protecting cover-attached camera according to claim 11, wherein said convex part is a pin.

14. A lens protecting cover-attached camera according to claim 13, wherein said pin is constrained by a spring member to bias said pin so as to maintain said plurality of members in a coupled state.

15. A lens protecting cover-attached camera according to claim 7, wherein said lens protecting cover includes a plurality of members covered by an elastic member.

16. A lens protecting cover-attached camera according to claim 7, wherein said lens protecting cover is supported on said shaft such that when an extraneous force is applied to said lens protecting cover positioned at the open position, said lens protecting cover pivots around said supporting shaft.

17. A lens protecting cover-attached camera according to claim 10, wherein said supporting shaft is a first supporting shaft, and said lens protecting cover further includes a second supporting shaft oriented in parallel to said first supporting shaft, and said plurality of members are coupled in a manner such that when an extraneous force is applied to said lens protecting cover positioned at the open position, said plurality of members become pivotable and pivot relative to each other around said second supporting shaft.

18. A lens protecting cover-attached camera according to claim 7, further comprising
   a strobe pop-up mechanism including a coupling member coupled to said strobe lighting unit, and
   a driving member for driving said coupling member in response to a movement of said lens protecting cover along a direction parallel to the optical axis of said lens barrel.

19. A lens protecting cover-attached camera according to claim 18, wherein said coupling member is a towline.

20. A lens protecting cover-attached camera according to claim 19, wherein said towline is tensioned by a pulley.

21. A lens protecting cover-attached camera according to claim 20, further comprising a restricting member for restricting the position of said pulley.

22. A lens protecting cover-attached camera according to claim 19, wherein said towline is a fibrous string or strap.

23. A lens protecting cover-attached camera according to claim 19, wherein said towline is a metallic wire.

24. A lens protecting cover-attached camera according to claim 19, wherein said towline is a resinous string or strap.

25. A lens protecting cover-attached camera according to claim 18, wherein said coupling member includes a towline and a swiveling member.

26. A lens protecting cover-attached camera according to claim 18, wherein said coupling member is a rotary ring capable of freely turning relative to said lens barrel.

27. A lens protecting cover-attached camera according to claim 18, further comprising an adjustment mechanism for adjusting the tension of said coupling member.

28. A lens protecting cover-attached camera according to claim 27, wherein said adjustment mechanism is an eccentric pulley.

29. A lens protecting cover-attached camera according to claim 27, wherein said adjustment mechanism is a plurality of projections.

30. A camera configured for shielding the face of a photographic lens, comprising:

a barrier including a plurality of plate members for shielding said face of the photographic lens; and a coupling mechanism for coupling said plurality of plate members together in a normal state, said coupling mechanism allowing said plate members to move relative to each other about a common point upon application of an extraneous force on at least one of said plate members.

31. A camera according to claim 30, wherein said barrier is adapted to move along a direction perpendicular to said photographic lens to expose said photographic lens.

32. A camera according to claim 30, wherein said plate members are adapted to be reset from an uncoupled state to a coupled state in response to manipulation of at least one of said plate members.

33. A lens protecting cover-attached camera, comprising:

a photographic lens having an optical axis and a face;

a lens protecting cover for protecting the face of said photographic lens;

a supporting shaft oriented in parallel to a plane substantially perpendicular to the optical axis of said photographic lens, said supporting shaft supporting said lens protecting cover;

a moving mechanism for moving said supporting shaft along a direction parallel to the optical axis of said photographic lens so that said lens protecting cover pivots around said supporting shaft from a closed position at which said lens protecting cover shields the face of said photographic lens, to an open position at which the face of said photographic lens is exposed, and for turning on or off a power switch in response to a movement of said moving mechanism relative to said photographic lens along a direction parallel to the optical axis of said photographic lens; and a predetermined member that moves in response to a movement of said moving mechanism.

\* \* \* \* \*